(12) United States Patent
Toda et al.

(10) Patent No.: US 6,464,034 B1
(45) Date of Patent: Oct. 15, 2002

(54) ELECTRICALLY POWERED STEERING DEVICE

(75) Inventors: Masaaki Toda; Koji Tateishi; Isamu Yoshida; Kiyoshige Yamauchi; Morihisa Yoshioka, all of Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/493,072

(22) Filed: Jan. 28, 2000

(30) Foreign Application Priority Data

| Feb. 4, 1999 | (JP) | 11-027720 |
| Mar. 11, 1999 | (JP) | 11-065139 |
| Apr. 15, 1999 | (JP) | 11-107390 |
| Apr. 15, 1999 | (JP) | 11-107391 |
| Apr. 15, 1999 | (JP) | 11-107392 |
| Apr. 27, 1999 | (JP) | 11-119080 |
| May 18, 1999 | (JP) | 11-137058 |

(51) Int. Cl.$^7$ ................................ B62D 5/04
(52) U.S. Cl. .................. 180/444; 91/380; 74/89.34
(58) Field of Search ........................ 180/444, 443, 180/400, 412, 413, 428, 436; 384/615, 623, 617; 74/424.5, 424.6, 424.7, 424.88, 424.82, 424.86, 424.81, 424.71, 89.23, 89.34, 89.44; 91/380

(56) References Cited

U.S. PATENT DOCUMENTS

| 3,512,426 A | * | 5/1970 | Dabringhaus ............ 74/424.87 |
| 4,415,054 A | | 11/1983 | Drutchas |
| RE32,222 E | * | 8/1986 | Drutchas ................ 180/444 |
| 4,666,014 A | * | 5/1987 | Carlson et al. ............ 180/444 |
| 4,773,497 A | * | 9/1988 | Carlson et al. ............ 180/444 |
| 4,800,974 A | * | 1/1989 | Wand et al. ............... 180/446 |
| 5,020,616 A | * | 6/1991 | Yagi et al. ................ 180/444 |
| 5,190,119 A | * | 3/1993 | Nomura et al. ........... 91/375 A |

FOREIGN PATENT DOCUMENTS

| JP | 54-47236 | 4/1979 |
| JP | 59-50864 | 3/1984 |
| JP | 6-201013 | 7/1994 |
| JP | 9-142315 | 6/1997 |
| JP | 11-11334 | 1/1999 |

* cited by examiner

Primary Examiner—F. Zeender
(74) Attorney, Agent, or Firm—Sughrue Mion, PLLC

(57) ABSTRACT

An electrically powered steering device comprises a ball screw mechanism for transmitting a steering force from a steering wheel to steerable vehicle wheels. The ball screw mechanism includes a rotary nut 11 having a nut body 11*a* in which a circulating passage 15 is formed so as to extend axially thereof, and end caps 14*a* and 14*b* secured respectively to opposite ends of the nut body 11*a*. Each of the end caps 14*a* and 14*b* has defined therein respective guideways 17*a* and 17*b* for balls 13 that communicate opposite ends of the circulating tunnel 14 with a ball rolling passage 12. The end caps 14*a* and 14*b* and the nut body 11*a* are made of a sintered alloy. The nut body 11*a* has an outer periphery of one end thereof that is axially progressively reduced in diameter to define a tapered surface.

14 Claims, 17 Drawing Sheets

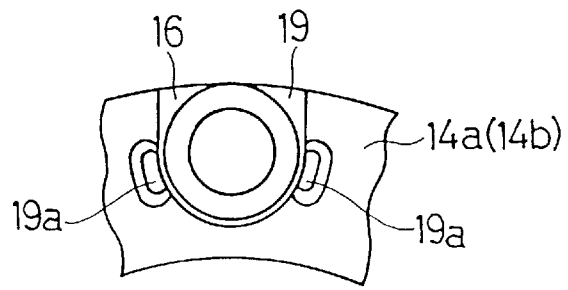
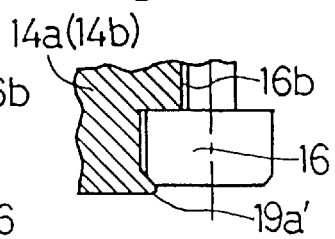
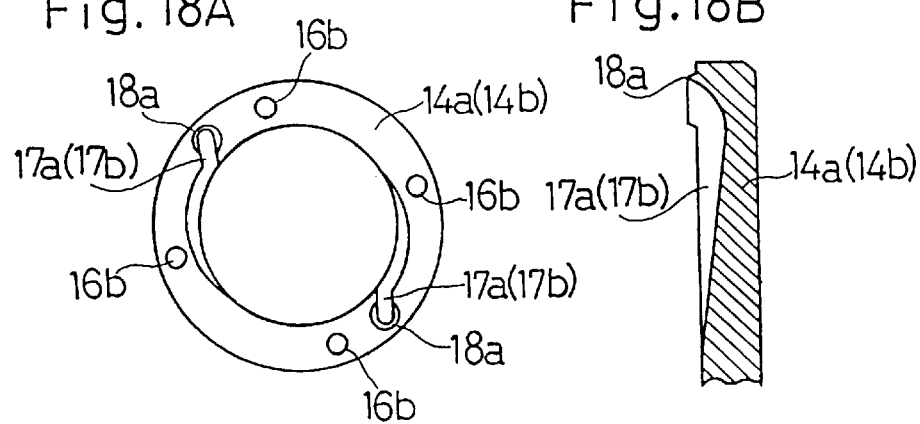
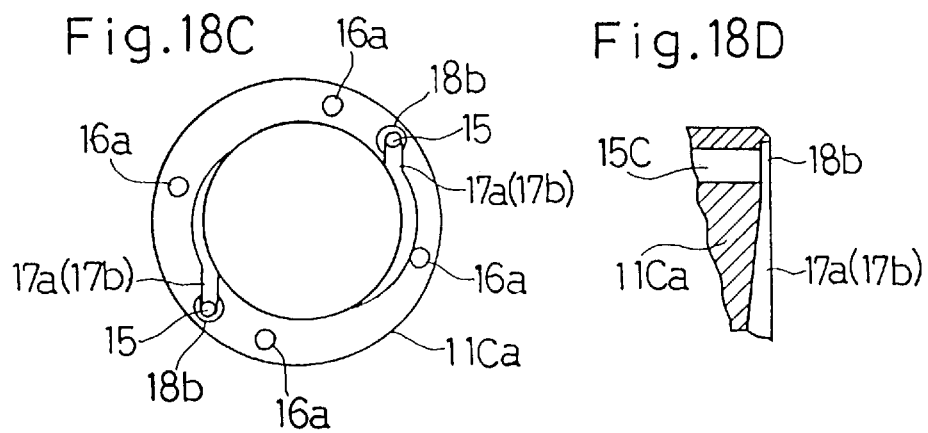

ELECTRICALLY POWERED STEERING DEVICE

BACKGROUND OF THE INVENTION

1. Field of the Invention

The present invention generally relates to an electrically powered steering device for an automotive vehicle and, more particularly, to the electrically powered steering device employing a ball screw mechanism for transmitting a drive output from an electric motor to a steering shaft to selectively advance and retract the latter.

2. Description of the Prior Art

The electrically powered steering device is an instrument to assist the steering force of a steering wheel by means of an electrically driven motor and is currently available in various types. One of the types employed is of a design wherein a retractable steering shaft coupled with a steering mechanism for vehicle wheels is imparted an axially shifting force that is transmitted thereto from the steering wheel through a motion translating mechanism such as a rack-and-pinion mechanism for translating a rotary motion of the steering wheel into the axially shifting motion and, also, an axially shifting force that is transmitted thereto from an output of the electrically driven motor through a ball screw mechanism. The ball screw mechanism is currently available in various types according to the manner in which a series of balls are circulated, including a bridge type, a tube circulating type and an end-cap type. The electrically powered steering devices of a rack-and-pinion type employing these ball screw mechanisms are disclosed in, for example, the Japanese Laid-open Patent Publication No. 59-50864 disclosing a basic structure, the Japanese Laid-open Patent Publication No. 9-142315 disclosing the use of the bridge type ball screw mechanism, the Japanese Laid-open Patent Publication No. 54-47236 disclosing the tube (circulator) type ball screw mechanism, and the Japanese Laid-open Patent Publication No. 6-20 1013 disclosing the use of a resin-made end cap type and a resin-made circulating pipe type.

FIG. 23A illustrates the prior art ball screw mechanism of the bridge type such as disclosed in the Japanese Laid-open Patent Publication No. 9-1423 15. As shown therein, a ball screw shaft 1 having an externally threaded groove 4 formed thereon has a ball screw nut 5 mounted therearound. The ball screw nut 5 has an inner peripheral surface formed with an internally threaded groove 5b in alignment with the externally threaded groove 4 to thereby define a ball guide passage for a series of balls 7. The ball screw nut 5 is arranged with a bridge member 5d that defines a connecting passage for connecting neighboring internally threaded grooves 5b. When the ball screw nut 5 rotates about and relative to the ball screw shaft 1, the ball screw shaft 1 is axially moved relative to the ball screw nut 5 by the effect of a reactive force from the threaded grooves. Since the balls 7 successively depart from the ball guide passage as they rollingly advance along and within the threaded grooves incident to rotation of the ball screw nut 5 and axial movement of the ball screw shaft 1, a supplement of the balls would be required depending on the amount of rotation. In view of this, the provision has been made of the bridge member 5b so that the balls 7 successively advanced along and within the threaded grooves can be returned to the threaded grooves through the connecting passage defined in the bridge member 5d.

On the other hand, shown in FIGS. 23A and 23B is an example of the prior art bridge type ball screw mechanisms that is disclosed in the Japanese Laid-open Patent Publication No. 54-47236. As shown in FIGS. 23A and 23B, of the groups of balls lined up in a region LA or LB in an axial direction of the ball screw nut 2, that is, the balls of either one of two rows of the balls rollingly move within threaded grooves formed in the ball screw shaft 1 over a distance corresponding to an axial length and interposed between the ball screw grooves. The two rows of balls 3A and 3B guided by respective rows of circulators 6A and 6B so as to circulate are interposed between the internally threaded groove 2a in the ball screw nut 2 and externally threaded grooves 1a and 1b in the ball screw shaft 1 while the balls of one row 3A are so designed as to have a diameter appropriately larger than that of the balls of the other row 3B, so that during the straight run of the automotive vehicle the balls of the row 3A can roll in part within the internally threaded groove 2a in the ball screw nut 2 and in part within the internally threaded groove 1a in the ball screw shaft 1 which has a large diameter portion $d_2$ while the ball of the row 3B can roll in part within the internally threaded groove 2a in the ball screw nut 2 and in part within the externally threaded groove 1b in the ball screw shaft 1 which have a reduced diameter portion $d_1$. Accordingly, the row of the balls 3A of the larger diameter that are guided by the circulator 6A are interposed between the internally threaded groove 2a in the ball nut 2 and the externally threaded groove 1a in the large diameter portion $d_2$ of the ball screw shaft 1 with no gap formed therebetween. In this design, when the steering wheel is turned rightwards (clockwise) or leftwards (counterclockwise) during the steering of the automotive vehicle, accompanied by rotation of the ball screw shaft 1, the ball screw nut 2 can be moved rightwards or leftwards through the threaded grooved and the rows of the balls 3A and 3B.

One example of the prior art end cap type ball screw mechanism is disclosed in the Japanese Laid-open Patent Publication No. 6-201013. According to this patent publication, an end cap is mounted on each of opposite ends of the ball screw nut to allow the balls to be returned to the circulating pipe and the end caps and the circulating pipe are both made of a synthetic resin.

FIG. 24 illustrates another type of the prior art end cap type ball screw mechanism. As shown therein, a rotary nut 71 has a substantially intermediate portion thereof formed with a radially outwardly protruding flange 72. A rolling bearing 73 is mounted externally on the rotary nut 71 so that the rotary nut 71 can be rotatably supported by and within a housing. A rotor 74 of an electrically driven motor for driving the rotary nut 71 about the longitudinal axis thereof is also mounted on the rotary nut 71. The radially outwardly protruding flange 72 is utilized for positioning the rolling bearing 73 and the rotor 74 relative to the rotary nut 71.

The rolling bearing 73 is of a so-called inner-race rotating type in which the inner race 73a is rotatable together with the rotary nut 71 and, for this purpose, the rotary nut 71 is press-fitted into the inner race 73a with a predetermined interference present between an inner peripheral surface of the inner race 73a and an outer peripheral surface of the rotary nut 71. On the other hand, since the rotor 74 cannot be press-fitted over the rotary nut 71 in a manner similar to the rolling bearing, a portion of the outer peripheral surface of the rotary nut 71 that is connected with the rotor 74 is knurled to provide a knurled surface area 75 for slipless engagement with the rotor 74. While the knurled surface area 75 can be formed by any known rolling process, an annular groove 76 is necessarily formed in the rotary nut 71 on each side of the knurled surface area 75 for the convenience of the rolling process. Also, a portion of the outer peripheral surface of the rotary nut 71 on one side of the knurled surface area 75 adjacent the end thereof is formed as a cylindrical guide portion 77 for guiding the rotor 74 onto the knurled surface area 75 before the rotor 74 is mounted on the knurled surface area 75 in a slipless fashion. The cylindrical guide portion 77 has a diameter slightly smaller than the outer diameter of the knurled surface area 75 of the rotary nut 71 so as to facilitate mounting of the rotor 74 onto the rotary nut 71.

Although the prior art bridge type shown in FIG. 23A has an advantage in that the ball screw nut 5 can have a relatively small outer diameter, not only is the number of component parts large because of the use of the separate bridge member 5d mounted on an outer diametric portion of the nut 5 that is depleted, but also difficulty is encountered in mounting a motor and a bearing onto the outer peripheral surface of the ball screw nut because of the use of the separate bridge member 5d mounted externally on the nut as a ball circulating component part. In addition, only chamfering can be effected to that end of the bridge member 5d secured to the nut 5 at an inner periphery of the ball screw nut 5 and, therefore, a step tends to be necessarily occur at the joint between the bridge member 5d and the ball screw nut 5. The step so formed will scrape a film of the lubricant deposited on the surface of each ball 7.

Also, since the bridge member 5d requires to be firmly connected in position with a bonding material filled in a depleted portion of the outer diameter of the ball screw nut 5, not only is the workability lowered, but also the bonding material used tends to come oozing, requiring a job of removing the deposited bonding material.

Where in the bridge type is applied to the ball screw in which the outer diameter of the nut is limited, the following limitation tends to occur. Specifically, in order to secure a high load capacity with the outer diameter of the nut reduced and having a reduced sectional height, it is necessary to accommodate an increased number of balls of a small size. Although in such case the employment of multi-thread grooves capable of increasing the load capacity is advantageous, the employment of the multi-thread grooves requires the bridge member 5d for returning the balls to be disposed so as to straddle the adjacent ball guide passage and, therefore, the employment of the multi-thread grooves is impractical and impossible.

In the prior art bridge type shown in FIGS. 23B and 23C, where the balls movable so as to circulate within the ball screw have the same diameters, the outer diameter of the ball screw nut 2 tends to increase, resulting in increase of the entire size of the steering device used in, for example, an automotive vehicle. Also, where a rack or the like is provided on the outer periphery of the nut, areas to be machines are limited and, therefore, the phase of the ball screw aligned with a neutral position of the steering wheel of the electrically powered steering device must be supervised.

Although the prior art bridge type shown in FIG. 23A has an advantage in that the screw nut 5 can have a relatively small outer diameter, not only is the number of component parts large because of the use of separate bridge member 5d mounted on an outer diametric portion of the nut 5 that is depleted, but also difficulty is encountered in mounting a motor and a bearing onto the outer peripheral surface of the ball screw nut because of the use of the separate bridge member 5d mounted externally on the nut as a ball circulating component part. In addition, only chamfering can be effected to that end of the bridge member 5d secured to the nut 5 at an inner periphery of the ball screw nut 5, and therefore, a step tends to necessarily occur at the joint between the bridge member 5d and the ball screw nut 5. The step so formed will scrape a film of the lubricant deposited on the surface of each ball.

With respect to the prior art end cap type shown in FIG. 14, an outer peripheral surface 71a of the rotary nut 71 adjacent a portion where the bearing is mounted is formed in a cylindrical shape. Accordingly, when the inner race 73a of the bearing 73 is press-fitted onto that portion of the outer peripheral surface 71a of the rotary nut 71, the inner race 73a tends to collide against an annular end edge of the outer peripheral surface 71a, resulting in reduction in workability during the press-fitting of the bearing 73. Even at the time of assemblage of the rotor 74, mounting of the rotor 74 onto the knurled surface area 75 through the guide area 76, utmost care is required to avoid any possible misalignment and formation of the step, requiring the increased number of manufacturing steps. Also, even where the separate end cap 77 is fastened to the nut body of the rotary nut 71 by the use of the bolt, the outer diameter of the end cap 77 is precautiously chosen to be slightly smaller than that of the guide area 76 to avoid any possible misalignment and formation of the step, but the selection of the outer diameters in this way brings about another problem in that the presence of the step interferes with the inner diameter of the rotor 74 at the time of mounting of the rotor 74. On the other hand, while the knurled surface area 75 is recommended to have a length as large as possible, limitation is imposed due to the machining and assembling problems.

SUMMARY OF THE INVENTION

Accordingly, the present invention has been devised to substantially eliminate the above discussed problems inherent in the prior art electrically powered steering device and is intended to provide an improved electrically powered steering device wherein the balls in the ball screw mechanism can roll and circulate smoothly and which is simple in structure and can easily be assembled while accomplishing a size reduction of the electrically powered steering device.

In order to accomplish the above described object, in one aspect of the present invention, there is provided an electrically powered steering device which comprises a housing; a steering shaft drivingly connected with a steering mechanism for steering wheels and extending completely through the housing; a motion translating mechanism for translating a rotary force exerted by a steering wheel into a force required to move the steering shaft in a direction axially of the steering shaft; a ball screw mechanism including a ball screw shaft constituted by a portion of the steering shaft, and a rotary nut; and an electric drive motor mounted at one end on an outer periphery of the rotary nut of the ball screw mechanism. The ball screw mechanism comprises the ball screw shaft having a spiral outer groove formed therearound. The rotary nut is formed with a spiral inner groove confronting to and aligned with the spiral outer groove on the ball screw shaft. A plurality of torque transmitting balls are disposed in a series within a ball rolling guideway defined between the spiral outer groove on the ball screw shaft and the spiral inner groove in the rotary nut and for transmitting a force between the rotary nut and the steering shaft. A ball circulating passage communicated with the ball rolling guideway is formed in part in a nut body of the rotary nut and in part in end caps secured to respective opposite ends of the nut body.

In the practice of the present invention, the ball circulating passage may include a circulating tunnel defined in the nut body so as to extend axially thereof, and a passage defined in one or both of an end face of the nut body and an inner end face of the end cap held in contact with such end face of the nut body so as to straddle therebetween for communicating a corresponding end of the circulating tunnel with the ball rolling guideway.

According to the structure described above, since the ball circulating mechanism does not protrude outwardly from the outer periphery of the rotary nut, the rotary nut of the ball screw mechanism can have a reduced outer diameter and the circulation of the balls can take place smoothly. In addition, not only can the number of component parts required be reduced, but also the number of manufacturing steps can be reduced, resulting in reduction in cost of manufacture.

Also in the practice of the present invention, a rolling bearing may be mounted on an outer periphery of the rotary nut for rotatably supporting the rotary nut relative to the housing, in which case the outer periphery of the rotary nut may be formed integrally with a radially outwardly protruding positioning flange for positioning the rolling bearing mounted thereon. This feature permits the rolling bearing for rotatably supporting the rotary nut can be positioned and fixed on the outer periphery of the rotary nut and, therefore, the electrically powered steering device can have a reduced radial size.

Preferably, each of the end caps may have a counterbore that is staked to prevent a fixing bolt, used to secure the respective end cap fixedly to the nut body, from being rotated arbitrarily. According to this feature, after fixing bolts for fixing the end caps to the nut body have been threadingly fastened, the counterbores are staked to lock the end caps relative to the nut body. Accordingly, any possible loosening of the fixing bolts once firmly fastened can be avoided with a simplified structure to thereby increase the reliability.

The ball rolling guideway of the ball screw mechanism may be of a multi-thread design. This feature makes it possible to reduce the diameter of the torque transmitting balls and then to arrange the torque transmitting balls and, therefore, the load bearing capacity can be increased while the radial dimension is reduced to render the device to be compact in size.

An outer periphery of one of opposite ends of a nut body forming a part of the rotary nut and having the spiral inner groove confronting to and aligned with the spiral outer groove around the ball screw shaft, and a circulating tunnel for the balls may be formed as a tapered surface tapering axially inwardly.

This design is particularly advantageous in that at the time the rolling bearing for the support of the nut is press-fitted to the rotary nut and the rotor of the electric drive motor is assembled relative to the rotary nut, the press-fitting of the rolling bearing can be facilitated accompanied by increase in workability because the outer periphery of the end of the nut body is tapered in shape. Also, even a guide during assemblage of the rotor can be performed smoothly because the outer periphery of the end of the nut body is tapered in shape.

Also, a portion of an outer peripheral surface of the nut body that is continued from the tapered surface may be formed into a cylindrical surface and wherein a knurled surface region for avoiding an arbitrary rotation is formed on the cylindrical surface and a portion of the tapered surface adjacent the cylindrical surface.

According to this structure, since the knurled surface region is formed on that portion of the tapered surface, the knurled surface region can have an increased effective width sufficient to ensure a rotational locking effect. Also, in the case where the knurled surface region is formed and if it is made of a sintered alloy, the necessity of use of an annular groove required to roll-form the knurled surface region can be advantageously dispensed with and the width of the knurled surface region can be increased correspondingly.

In the practice of the present invention, each of the end caps may have an outer peripheral surface that is tapered in a direction away from the nut body, wherefore the workability in performing the press-fitting of the rolling bearing and the assemblage of the rotor can further be increased.

According to another aspect of the present invention, there is provided an electrically powered steering device which comprises a housing; a steering shaft drivingly connected with a steering mechanism for steering wheels and extending completely through the housing; a motion translating mechanism for translating a rotary force exerted by a steering wheel into a force required to move the steering shaft in a direction axially of the steering shaft; a ball screw mechanism including a ball screw shaft constituted by a portion of the steering shaft, and a rotary nut; and an electric drive motor mounted at one end on an outer periphery of the rotary nut of the ball screw mechanism. The rotary nut of the ball screw mechanism used is so structured and so configured as will be described, below.

This rotary nut is of a so-called "end cap type" wherein one of the end caps is formed integrally with the nut body. More specifically, the has defined therein a spiral inner groove confronting to and aligned with a spiral outer groove defined on the ball screw shaft, and a ball circulating passage continued with respective opposite ends of the spiral inner groove and includes a nut body and an end cap firmly connected to one of opposite ends of the nut body. The ball circulating passage includes a circulating tunnel defined in the nut body so as to extend axially thereof, and end passages continued from respective opposite ends of the circulating tunnel to the spiral inner groove, and the nut body has the spiral inner groove, the circulating tunnel of the ball circulating passage and one of the end passages, said end cap having the other of the end passages defined therein.

According to the above described structure, since the joint between the nut body of the rotary nut and the end cap in the ball screw mechanism is found only at one location adjacent the corresponding end of the nut body, the possibility in which rolling motion of the balls in the spiral inner groove and circulation of the balls in the ball circulating passage may be hampered in the presence of the joint can be advantageously reduced about 50% of that which would be brought about by the presence of the two joints. For this reason, rolling motion and lubrication of the balls can be performed smoothly with a reduced possibility of the lubricant film on the surfaces of the balls being removed. Accordingly, the ball screw mechanism can have an increased lifetime. Also, since the rotary nut is made up of the nut body and the only end cap, the number of the component parts is reduced, resulting in an excellent assemblility so that automation of the manufacture of the ball screw mechanism can be facilitated. It is to be noted that since one end of the rotary nut is utilized to support the end cap fastened thereto, mounting of the balls can be carried out while the end cap is removed from the nut body.

In the practice of the present invention, the end cap is preferably connected to one of opposite ends of the nut body adjacent the rotor, and a rolling bearing for supporting the rotary nut may be mounted on the other of the opposite ends of the nut body.

Where this design is employed, the end of the rotary nut where the rolling bearing is press-fitted is completely free from the presence of any step which would be formed on the outer peripheral surface thereof during fastening of the end cap thereto since a portion which ought to be an end cap is integrated together with the nut body, thereby facilitating the press-fitting of the rolling bearing.

Where the end cap is connected to the end of the nut body adjacent the rotor, the outer peripheral surface of the end cap may be formed as a tapered surface tapering axially inwardly in a direction away from the nut body.

Formation of the tapered surface on the outer peripheral surface of the end cap can facilitate assembly by mounting the rotor of the electric drive motor.

The electrically powered steering device of the present invention is featured in that an inner race raceway for the rolling bearing of the ball screw mechanism is formed integrally with the outer peripheral surface of the rotary nut.

According to this structure, the use of an inner race of the bearing for the support of the rotary nut can be dispensed with and, instead, the raceway corresponding in function to the inner race is formed directly on the rotary nut. Therefore, not only can the device as a whole have a reduced outer diameter and be compact in size, but also if the outer diameter remains the same as in the prior art, a sectional height of the rotary nut can be increased, to thereby increase the lifetime and also to provide a relatively large freedom of design choice. Also, since the inner race which is a component part dedicated to the bearing is eliminated and the inner race raceway is formed directly on the rotary nut, a step of press-fitting the bearing inner race onto the rotary nut is advantageously eliminated and the number of the component parts required is reduced, thereby bringing about a meritorious effect on the assembly.

In the practice of the present invention, the end cap may be made of a sintered alloy. The use of the sintered alloy as a material for the end cap makes it possible to employ the injection molding process in which, even when the ball rolling passage is of a multi-thread design, a reversing portion in the end can be accurately and inexpensively formed by injecting the material. By choosing a combination of metallic powdery materials to be mixed together, the physical strength can be increased accompanied by a corresponding increase of the lifetime.

Also, in the practice of the present invention, the nut body may be made of a sintered alloy. The use of the sintered alloy as a material for the nut body makes it possible to employ the injection molding process and the sintering process to form the rotary nut accurately and inexpensively on a mass-production basis, with no need to use any machining process such as turning and grinding. In addition, by suitably choosing a combination of the metallic powdery materials to be mixed together, the required physical strength and the durability can be maintained. Also, unlike the rotary nut made of a synthetic resin, the durability which would be reduced as a result of frictional wear is excellent and a little influence of thermal change is brought about on the dimension, and when the end cap is fastened and fixed to the nut body by the use of bolts, no problem is found which would result from an elastic deformation brought about by the fastening pressure and, therefore, the fastening torque can be properly supervised.

According to a third aspect of the present invention, there is provided an electrically powered steering device which comprises a housing; a steering shaft drivingly connected with a steering mechanism for steering wheels and extending completely through the housing; a motion translating mechanism for translating a rotary force exerted by a steering wheel into a force required to move the steering shaft in a direction axially of the steering shaft; a ball screw mechanism including a ball screw shaft constituted by a portion of the steering shaft, and a rotary nut; and an electric drive motor mounted at one end on an outer periphery of the rotary nut of the ball screw mechanism. The rotary nut used in the ball screw mechanism is of the structure which will now be described.

Specifically, the rotary nut of the ball screw mechanism has defined therein a spiral inner groove confronting to and aligned with a spiral outer groove defined on the ball screw shaft, and a return groove connecting neighboring convolutions of the spiral inner groove to thereby define a circumferential circuit for the balls. Also, a portion of the rotary nut where the return groove is formed is formed integrally with a portion where the spiral inner groove and a portion forming the outer peripheral surface. The term "integrally formed" referred to hereinabove is intended to means non-use of separate component parts connected together.

According to the above described construction, since the rotary nut is of a design wherein the neighboring convolutions of the spiral inner groove are connected together through the return groove, as is the case with the prior art bridge type, no ball return passage is found on the outer periphery of the nut and the rotary nut can therefore have a reduced outer diameter. Moreover, since the return groove is integrally formed in the rotary nut, unlike the bridge type, no step which would be formed when the separate member is mounted is found on the outer peripheral surface of the rotary nut and, therefore, the inner race of the bearing for rotatably supporting the rotary nut can be positioned and fixed on the outer peripheral surface thereof and the rotor of the electric drive motor can be easily mounted. For these reasons, the electrically powered steering device as a whole can be assembled in a compact size. Also, since the return groove is formed integrally in the rotary nut, no joint is formed on an inner peripheral surface of the rotary nut and, therefore, not only can the ball circulate smoothly, but also the lubricant film deposited on the surface of each of the balls will not be scraped off, allowing the ball screw mechanism to have an increased lifetime.

In the practice of the present invention, the spiral outer groove of the ball screw mechanism may have a groove face formed with a hardened layer of a generally uniform depth that is formed by means of a high frequency hardening process. According to this structural design, the depth of the hardened layer formed on the groove face of the spiral outer groove of the ball screw mechanism is uniformly kept at the predetermined value along the curvature of the spiral outer groove and, therefore, the rolling lifetime of the spiral outer groove can be secured and, by allowing the hardened layer not to be formed to a depth greater than necessary, the steering shaft having an excellent toughness and an excellent straightness can be obtained.

Preferably, the hardened layer may advantageously have a Rockwell hardness HRC within the range of 55 to 62 and, in addition thereto or separate therefrom the hardened layer may advantageously have an effective hardened layer depth within the range of 0.20 to 1.10 mm.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 17A is a fragmentary side view, on an enlarged scale, of the end cap showing a counterbore defined therein;

FIGS. 17B and 17C are fragmentary sectional views showing the counterbore before and after pressing of a projection after a bolt has been screwed in, respectively;

FIG. 18A is an end view of the end cap as viewed internally;

FIG. 18B is a side sectional view, on an enlarged scale, of the end cap showing a reversing passage defined therein;

FIG. 18C is an end view of the rotary nut showing the reversing passage defined therein in communication with a throughhole;

FIG. 18D is a side sectional view, on an enlarged scale, of the rotary nut showing communication between the throughhole and the reversing passage defined in the rotary nut;

DETAILED DESCRIPTION OF THE EMBODIMENTS

Figure 1:
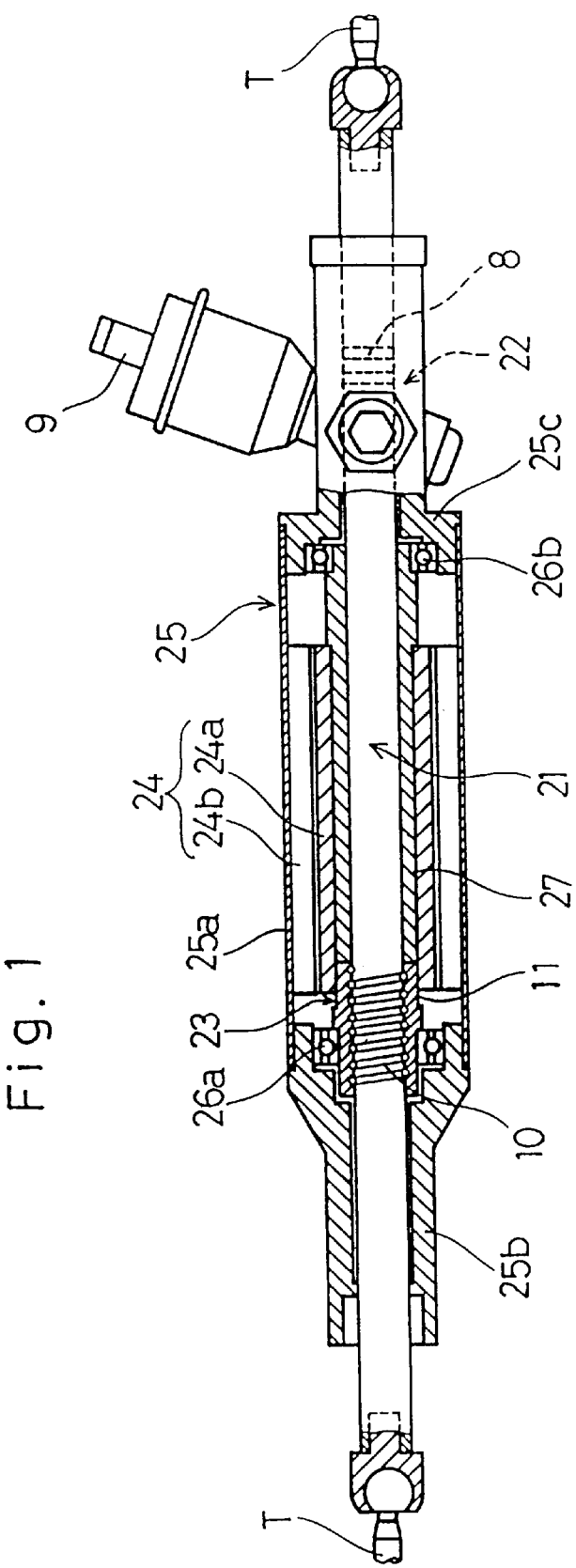
FIG. 1 is a longitudinal side view of a ball screw mechanism, with a portion broken away, for use in association with an electrically powered steering device according to a first preferred embodiment of the present invention.
Figure 2:
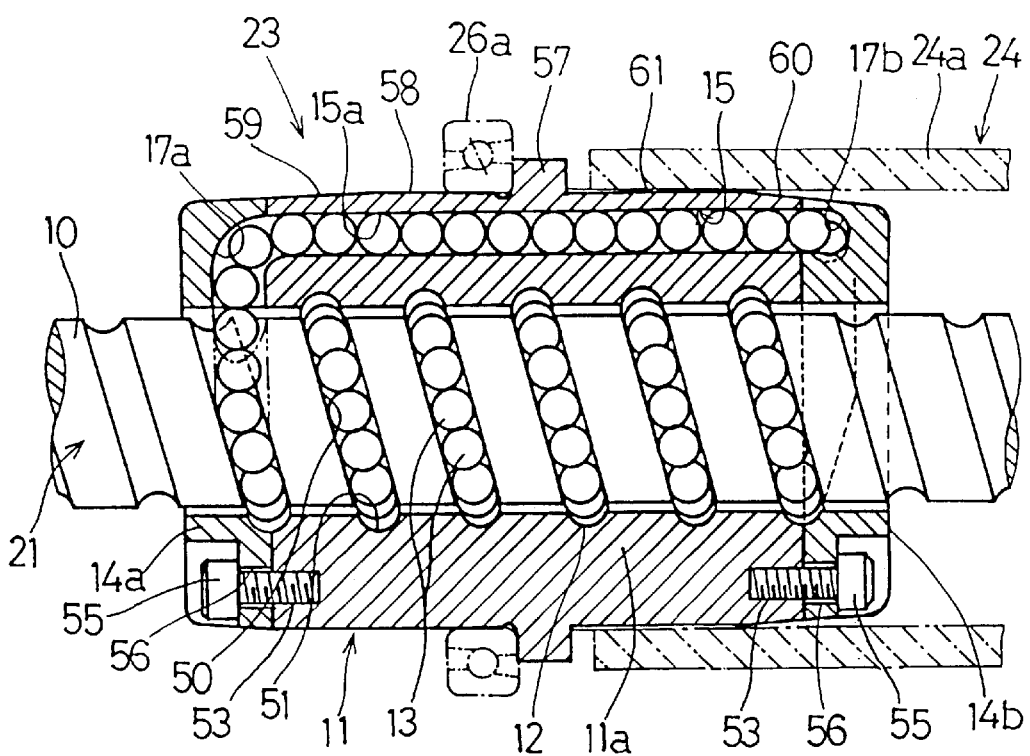
FIG. 2 is a longitudinal sectional view, on an enlarged scale, of the ball screw mechanism shown in FIG. 1.

Referring first to FIG. 1, a generally cylindrical housing 25 has a bracket (not shown) through which the housing 25 is fixedly connected to an automobile chassis or body structure. This housing includes a steering shaft 21 rotatably extending within the housing 25 and drivingly connected at its opposite ends with respective tie rods T and T which are in turn drivingly connected with a steering mechanism (not shown) for steering, for example, front tire wheels.

A steering rod 9 extends diagonally upwardly from one end portion of the cylindrical housing 25 and has an upper end fixedly connected with a steering wheel (not shown). The steering rod 9 is rotatably supported and, when the steering wheel is turned either clockwise or counterclockwise with respect to the longitudinal axis of the steering rod 9, rotation of the steering rod 9 is transmitted to the steering shaft 21 through a motion translating mechanism 22, positioned adjacent a lower end of the steering rod 9, so that the steering shaft 21 can be moved axially within the cylindrical housing 25. The motion translating mechanism 22 includes a rack 8 which may be a part of, or otherwise formed on, a longitudinal portion of the steering shaft 21, and a pinion (not shown) fixedly mounted on the lower end of the steering rod 9 and meshed with the rack 8 within the cylindrical housing 25. Although not shown, a steering torque detector is mounted in association with the steering rod 9 for detecting a steering torque with which the steering wheel is turned.

The cylindrical housing 25 is of a generally three-piece construction including an intermediate cylindrical body 25a and generally tubular end members 25b and 25c capped onto respective opposite ends of the intermediate cylindrical body 25a. A generally cylindrical stator 24b of an electric drive motor 24 is coaxially disposed within the intermediate cylindrical body 25a of the housing 25 and positioned substantially intermediate of the length of the housing 25. This cylindrical stator 24b is comprised of a core and a stator coil. A cylindrical rotor 24a of the electric drive motor 24 is housed within the cylindrical stator 24b and has an outer peripheral surface spaced a slight distance radially inwardly from an inner peripheral surface of the stator 24b to define a gap therebetween. The cylindrical rotor 24a is made of a magnet or a magnetic material and is mounted on a sleeve 27 for rotation together therewith. The steering shaft 21 referred to hereinbefore extends within the sleeve 27 for movement in a direction axially thereof. The electric drive motor 24 is controlled by a motor control circuit (not shown) according to the torque detected by the steering torque detector.

One of opposite ends of the sleeve 27 adjacent, for example, the steering rod 9 as shown is rotatably supported within the housing 25 by means of a rolling bearing 26b. The rolling bearing 26b may be a single bearing or a combination of a plurality of bearings and is of a type capable of supporting not only a radial load, but also a thrust load.

Rotation of the electric drive motor 24 can be transmitted to the steering shaft 21 through a ball screw mechanism 23 to move the steering shaft 21 axially within the housing 25. The ball screw mechanism 23 includes a ball screw shaft 10 which is represented by an axial portion of the steering shaft 21. In other words, in the illustrated embodiment, the axial portion of the steering shaft 21 is formed with an externally helically threaded groove to define the ball screw shaft 10.

The ball screw mechanism 23 also includes a rotary nut 11 supported rotatably within the housing 25 through a rolling bearing 26a that is mounted externally on the rotary nut 11 and having one end press-fitted into the cylindrical rotor 24a of the electric drive motor 24. One end of the cylindrical rotor 24a adjacent the rotary nut 11 protruded axially outwardly from the sleeve 27 so as to receive the rotary nut 11 under interference fit.

The rolling bearing 26a may be a single bearing or a combination of a plurality of bearings and is of a type capable of supporting not only a radial load, but also a thrust load. In the illustrated embodiment, the rolling bearing 26a is employed in the form of, for example, an angular ball bearing or the like and is of a design including inner and outer races with a group of rolling elements interposed between the inner and outer races.

The details of the ball screw mechanism 23 will now be described with particular reference to FIGS. 2 to 5. This ball screw mechanism 23 includes the ball screw shaft 10, the rotary nut 11 and a group of torque transmitting balls 13 operatively interposed between the ball screw shaft 10 and the rotary nut 11.

This ball screw mechanism 23 is of a so-called "end cap type" in which the rotary nut 11 is comprises of a nut body 11a and two end caps 14a and 14b connected to respective opposite ends of the nut body 11a.

The nut body 11a has an internally spirally threaded inner groove 51 (referred to as an "inner spiral groove") defining an inner spiral ball raceway, a circulating tunnel 15a and a plurality of bolt holes 53. The inner spiral groove 51 of the nut body 11a confronts and is aligned with an externally spirally threaded outer groove 50 (referred to as an "outer spiral groove") on the ball screw shaft 10 that defines an outer spiral ball raceway. A ball rolling guideway 12 for the balls 13 is defined between the outer spiral groove 50 and the inner spiral groove 51. The circulating tunnel 15a extends in the nut body 11a in a direction axially thereof and has its opposite ends communicated with respective opposite ends of the ball rolling guideway 12 that are spaced axially of the nut body 11a in a manner which will now be described.

The end caps 14a and 14b connected to the opposite ends of the nut body 11a and utilized to circulate the balls 13 from the outer spiral groove 50 to the circulating tunnel 15a and then from the circulating tunnel 15a to the outer spiral groove 50 and are in the form of a ring having an inner diameter equal to that of the nut body 11a. Each of the end caps 14a and 14b has a grooved guideway 17a and 17b defined on a surface of the respective end cap 14a and 14b which is, when such end cap 14a and 14b is connected to the nut body 11a, brought into contact with the nut body 11a. The grooved guideway 17a or 17b defined in each of the end caps 14a or 14b is made up of a helical groove segment defined in an inner peripheral surface of the respective end cap 14a or 14b in communication with the inner spiral groove 51 and extending an angle not greater than 180 degrees with respect to the longitudinal axis of the nut body 11a, and a slant groove segment continued to and extending radially outwardly and slantwise from the helical groove segment. Thus, the circulating tunnel 15a and the grooved guideways 17a and 17b define a ball circulating passage 15.

Each of the end caps 14a and 14b is formed with bolt insertion holes 56 formed therein at respective locations alignable with the bolt holes 53 in the corresponding end of the nut body 11a for passage therethrough of corresponding bolts 55. Each end cap 14a or 14b has an outer surface formed with a counterbore defined therein in alignment with the respective bolt insertion hole 53. The end caps 14a and 14b are secured to the respective ends of the nut body 11a by means of the bolts 55 passing through the bolt insertion holes 56 and firmly threaded into the corresponding bolt holes 53. Each of the end caps 14a and 14b has an outer peripheral surface gradually tapered in a direction away from the nut body 11a and a corner region of each end cap 14a or 14b delimited between the outer peripheral surface and the outer surface thereof is chamfered to render it to represent an arcuately curved sectional shape.

Figure 3:
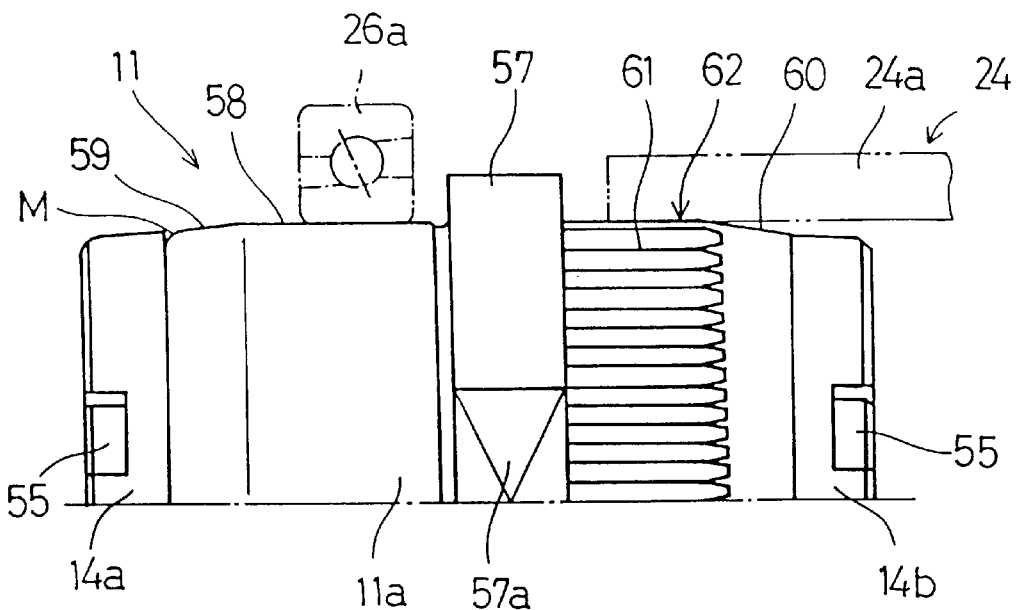
FIG. 3 is a fragmentary longitudinal side view of the ball screw mechanism of FIG. 2, showing a rotary nut employed therein.
Figure 4:
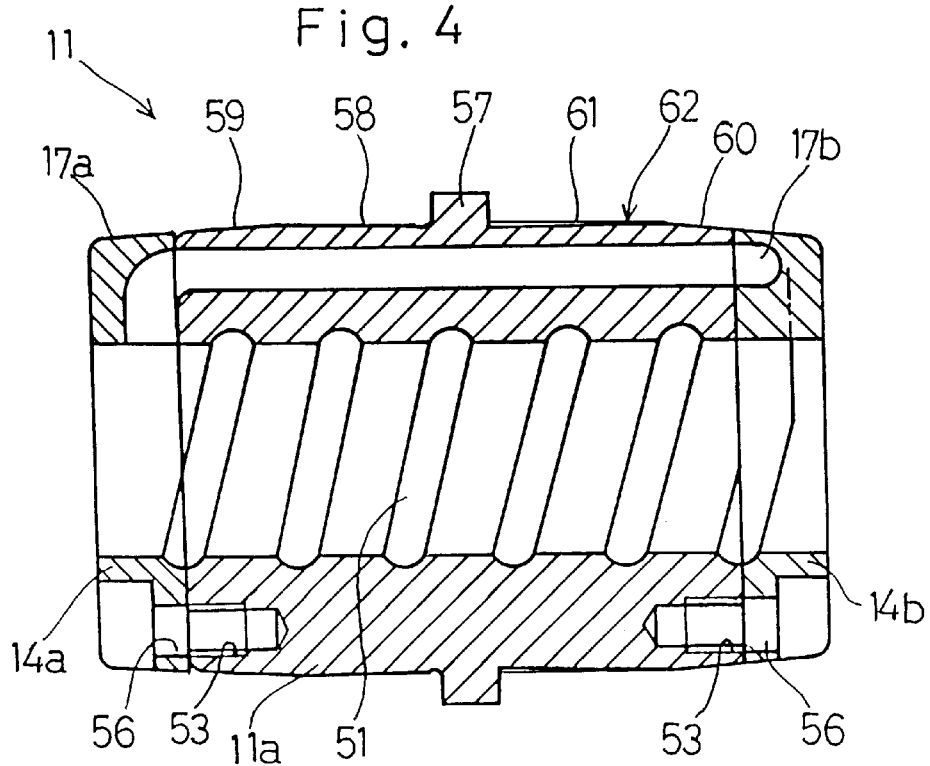
FIG. 4 is a longitudinal sectional view showing the rotary nut shown in FIG.3.
Figure 5:
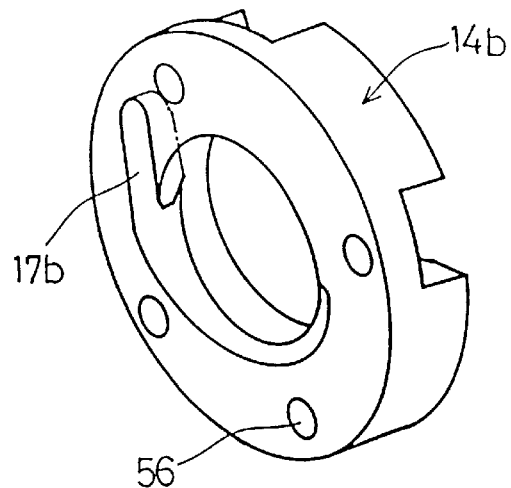
FIG. 5 is a perspective view of an end cap forming a part of the rotary nut shown in FIG. 3.

The rotary nut 11 has an outer periphery of a shape which will now be described. As hereinbefore mentioned, the nut body 11a is of a cylindrical shape and, as best shown in FIG. 3, is integrally formed with an annular flange for positioning the rolling bearing 26a, so as to protrude radially outwardly from a generally intermediate portion of the outer peripheral surface of the nut body 11a. The annular flange 57 has a cylindrical outer peripheral surface having a portion of the circumference thereof flattened at 57a for positioning purpose. Respective portions of the outer peripheral surface of the but body 11a on respective sides of the annular flange 57 are formed as a cylindrical surface area 58, onto which the rolling bearing 26a is press-fitted, and a mounting area 62 onto which the cylindrical rotor 24a of the electric drive motor 24 is mounted. An outer peripheral surface of the end of the nut body 11a adjacent the cylindrical surface area 58, that is, a portion of the outer peripheral surface of the rotary nut 11 delimited between the cylindrical surface area 58 and the end face thereof is slightly converged in a direction axially outwardly of the rotary nut 11 towards the end cap 17a so as to define a tapered surface 59 with a corner area chamfered at M to render it to represent an arcuately curved sectional shape to thereby avoid any possible galling of that corner area.

On the other hand, the mounting area 62 is slightly converged in a direction axially outwardly towards the end cap 17b from a cylindrical surface region to the opposite end to thereby define a tapered surface 60. A knurled surface region 61 is defined on the cylindrical region of the mounting area 62 and a portion of the tapered surface 60 for locking the cylindrical rotor 24a from being rotated relative to the rotary nut 11. The knurled surface region 61 may be not be always limited to a multiplicity of parallel grooves, but may be a mesh-like grooves. Each of the tapered surfaces 59 and 60 on the respective ends of the nut body 11a is tapered at an angle of 10 to 15 degrees.

Each of the nut body 11a and the end caps 14a and 14b forming respective parts of the rotary nut 11 is preferably made of a sintered alloy. Formation of those component parts of the rotary nut 11 may be carried out by the use of any known injection molding machine using a metallic powder adjusted to represent a plastizeable form.

One example of manufacture with the use of the injection molding machine will be described. At the outset, a metallic powder and a binder prepared from a mixture of plastics with wax are kneaded in a kneading machine and the resultant kneaded product is subsequently pelletized to produce pellets. The metallic powder which can be used in the practice of the present invention is preferably in the form of a metallic material capable of being subsequently carbonized and quenched and may comprise 0.3% of carbon (C), 1 to 2% nickel (Ni) and the balance being iron (Fe).

Figure 6:
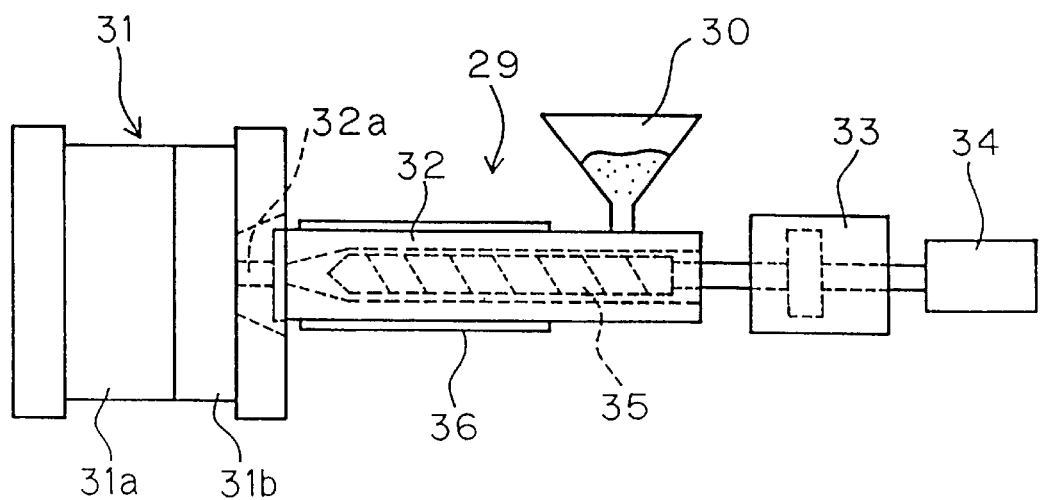
FIG. 6 is a side view showing an injection molding machine used to form the rotary nut.

The pellets so prepared are supplied into a hopper 30 of the injection molding machine 29 shown in FIG. 6 and are, after having been heated to melt within the injection molding machine 29, injected into a mold 31. The injection molding machine 29 used in the practice of the present invention is similar to that generally used in association with plastics molding and comprises a cylinder 32 having a nozzle 32a fitted to a mold exit of the machine 29, a screw feeder 35 accommodated within the cylinder 32 and driven by a hydraulic motor 34 through a hydraulic cylinder 33, and a heater 36 positioned externally of the cylinder 32 for heating the molding material being feed by the screw feeder 35.

Figure 7A:
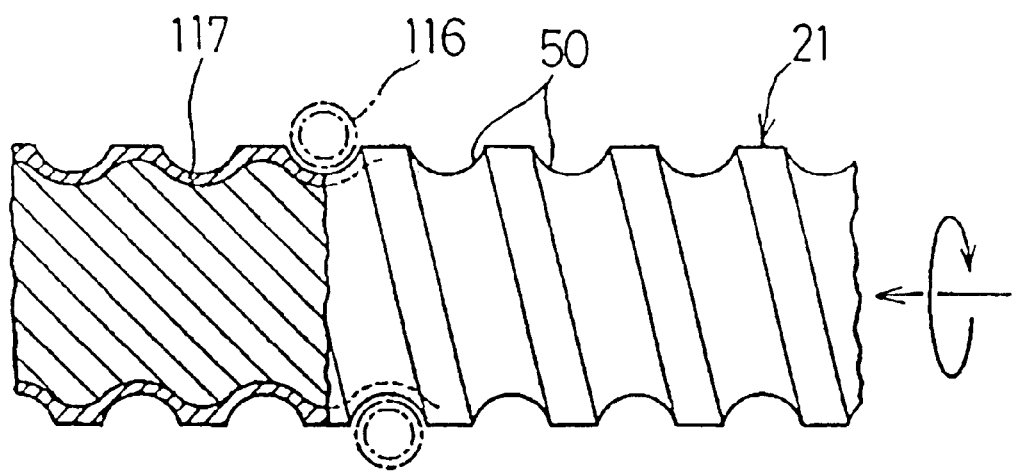
FIG. 7A is a longitudinal sectional view, with a portion cut out, of a portion of a steering shaft showing a spirally grooved guide face in a condition of being high-frequency hardened in accordance with the teachings of the present invention.
Figure 7B:
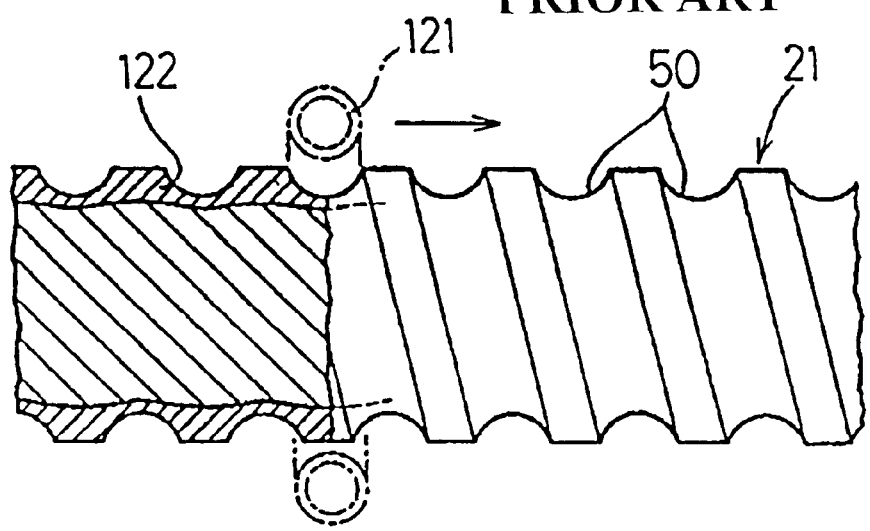
FIG. 7B is a longitudinal sectional view, with a portion cut out, of a corresponding portion of the prior art steering shaft showing a spirally grooved guide face in a condition of being high-frequency hardened.

A spiral groove which eventually forms the outer spiral groove 50 on the ball screw shaft 10 of the steering shaft 21 is formed by the use of a rolling technique. Specifically as shown in FIG. 7A, the outer spiral groove 50 has a groove faces formed with a hardened layer 117 that is formed by disposing in the proximity of the outer spiral groove 50 a spiral heating coil 116 having a radius of curvature that is equal to the average sectional radius of curvature of the outer spiral groove, and then, rotating the ball screw shaft 10 so as to move axially as shown by the arrows in FIG. 7A while the steering shaft 21 has been matched with the angle of helix of the spiral groove. It is to be noted that the spiral heating coil 116 may have a plurality of turns.

The hardened layer 117 so formed on the groove face of the spiral outer groove 50 is, unlike the hardened layer 112 found in the prior art as shown in FIG. 713, spaced a uniform distance from the heating coil 116 during the high frequency quenching process and has therefore a generally uniform predetermined depth. A surface portion between the neighboring convolutions of the spiral outer groove 50 in the ball screw shaft 10 is not hardened to a depth greater than necessary. It is to be noted that the hardened layer 117 has a surface hardness of 55 to 62 in terms of HRC according to Rockwell hardness and an effective thickness thereof within the range of 0.20 to 1.10 mm.

The operation and function of the structure described above will now be described. Assuming that the automotive vehicle is driven straight without the steering wheel being substantially turned, the steering torque detector (not shown) associated with the steering rod 9 provides no output and, therefore, the electric drive motor is held in inoperative position by the motor control means (not shown). Accordingly, the electrically powered steering device is in position not to provide an assisted steering force.

In the event that the steering wheel is turned, the steering torque detector associated with the steering rod 9 provides an output therefrom and, under the control of the motor control circuit, the electric drive motor 24 rotates the rotor 24a. As the rotor 24a is rotated, the rotary nut 11 of the ball screw mechanism 23 undergoes rotation together with the rotor 24a, causing the steering shaft 21, which is an integral part of the ball screw shaft 10, to move axially to thereby produce an assisted steering force.

At this time, the balls 13 of the ball screw mechanism 23 rollingly move within the ball rolling guideway defined between the spiral inner and outer grooves 50 and 51 and circulate from the ball rolling guideway back to the ball rolling guideway through the guideway 17a in the end cap 14a, then through the circulating tunnel 15a and finally through the guideway 17b in the end cap 14b.

In this way, the steering force of the steering wheel can be assisted by the electric drive motor 24.

In the electrically powered steering device of the structure described above, since the nut body 11a of the rotary nut 11 is formed with the tapered surface 59 on the outer peripheral surface of the end thereof on which the rolling bearing 26a is press-fitted, the press-fitting of the rolling bearing 26a can easily be accomplished accompanied by an increased workability, without allowing the rolling bearing 26a being misaligned with the rotary nut 11. On the other hand, since the outer periphery of the end of the nut body 11a onto which the rotor 24a is mounted is formed into the tapered surface 60, guiding of the rotor 24a during assemblage of the rotor 24a can be accomplished smoothly. Also, since the tapered surface 60 is also partially formed with the knurled surface area 61 for locking the rotor 24a, the knurled surface area 61 can effectively have an increased width, resulting in an increased effect of locking the rotor 24a against its rotation.

Where the nut body 11a is made of a sintered alloy, the nut body 11a can be manufactured by the use of the injection molding technique in combination with sintering on a mass-production basis to thereby eliminate the use of a machining process such as turning and grinding. The technique in which the injection molding technique and the sintering technique are utilized in combination, which is highly precise, has been developed and, therefore, it can be utilized to manufacture the rotary nut 11 with high precision. Also, since the knurled surface area 61 can also be formed during the injection molding process, the annular groove solely intended for the rolling process can advantageously be dispensed with, allowing the knurled surface area 61 to be formed to a position adjacent the annular flange 57. For this reason, the knurled surface area 61 can further effectively secure the width.

Because of the unique shapes of the nut body 11a and the end caps 14a and 14b, the assemblage can further be facilitated, accompanied by increase in workability.

In addition, the depth of the quenched hardened layer formed on the groove face of the spiral outer groove 50 of the ball screw shaft 10 is uniformly kept at the predetermined value along the curvature of the spiral outer groove and, therefore, the rolling lifetime of the spiral outer groove 50 can be secured and, by allowing the hardened layer not to be formed to a depth greater than necessary, the steering shaft 21 having an excellent toughness and an excellent straightness can be obtained.

A second preferred embodiment of the present invention will now be described.

The electrically powered steering device according to the second preferred embodiment of the present invention is substantially similar to that according to the first preferred embodiment in that the rolling bearing 26a and the ball screw mechanism 23A altogether constitute a bearing-mounted ball screw mechanism 90.

Figure 8:
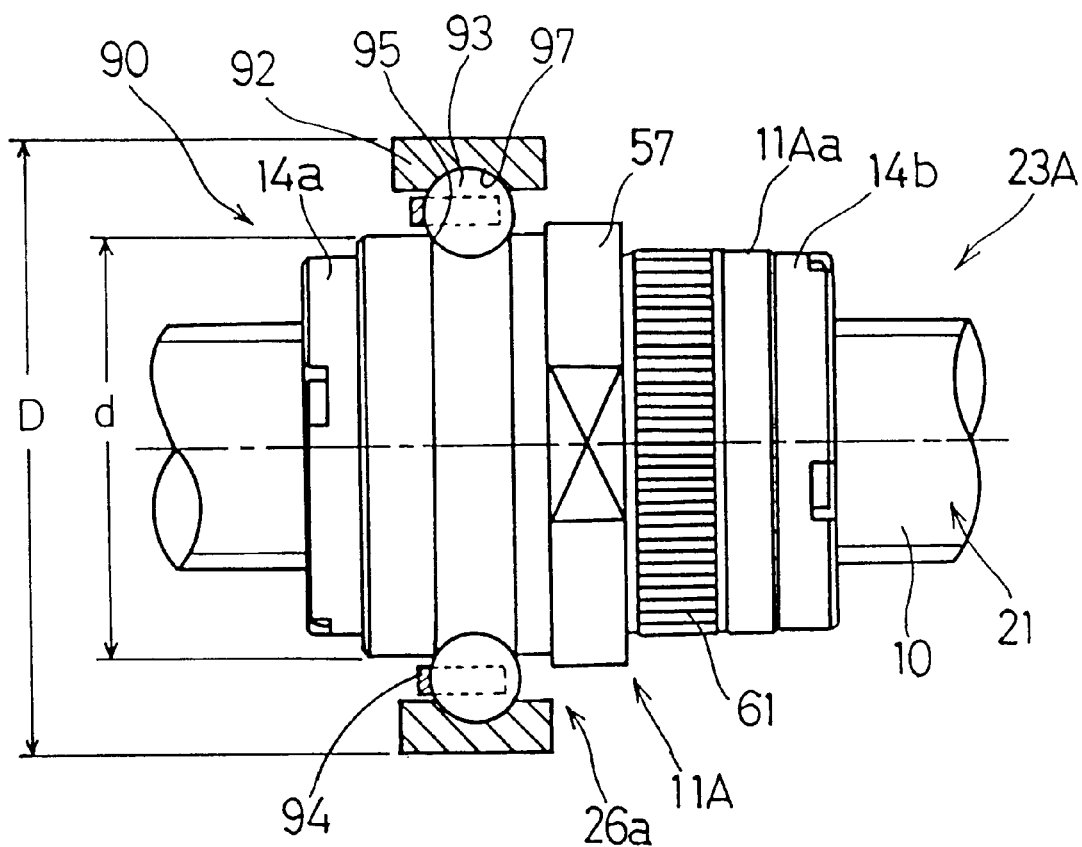
FIG. 8 is a longitudinal side view of a bearing-mounted ball screw mechanism, with a portion broken away, for use in association with an electrically powered steering device according to a second preferred embodiment of the present invention.

As shown in FIG. 8, the bearing-mounted ball screw mechanism 90 is of a design in which an outer peripheral surface of the rotary nut 11A of the ball screw mechanism 23A is formed integrally with an inner race raceway 95 for the rolling bearing 26a so that the rolling bearing 26a and the ball screw mechanism 23A are integrated together in a unitary component.

The rolling bearing 26a makes use of the rotary nut 11A of the ball screw mechanism 23A as an inner race and includes, in addition to the rotary nut 11A, an outer race 92, a plurality of rolling elements 93 operatively interposed between respective raceways 95 and 97 of the inner and outer races, and a retainer 94 for retaining the rolling elements 93. The rolling elements 93 are employed in the form of balls such as, for example, steel balls and each of the inner race raceway 95 and the outer race raceway 97 is in the form of a groove of a substantially accurate cross-section. This rolling bearing 26a is of a type capable of supporting the radial and thrust loads and the relationship between the rolling elements 93 and the respective raceways 95 and 97 of the inner and outer races is similar to that in a deep-groove ball bearing or an angular ball bearing.

Figure 9:
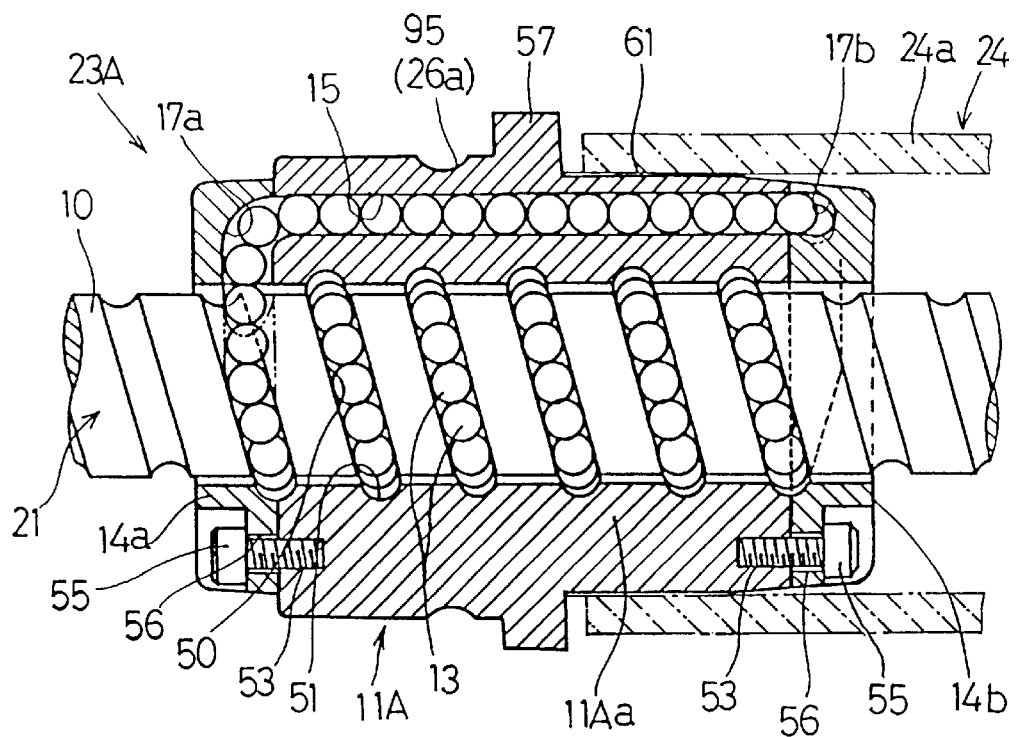
FIG. 9 is a longitudinal sectional view of the bearing-mounted ball screw mechanism shown in FIG. 8, showing the ball screw mechanism.
Figure 10:
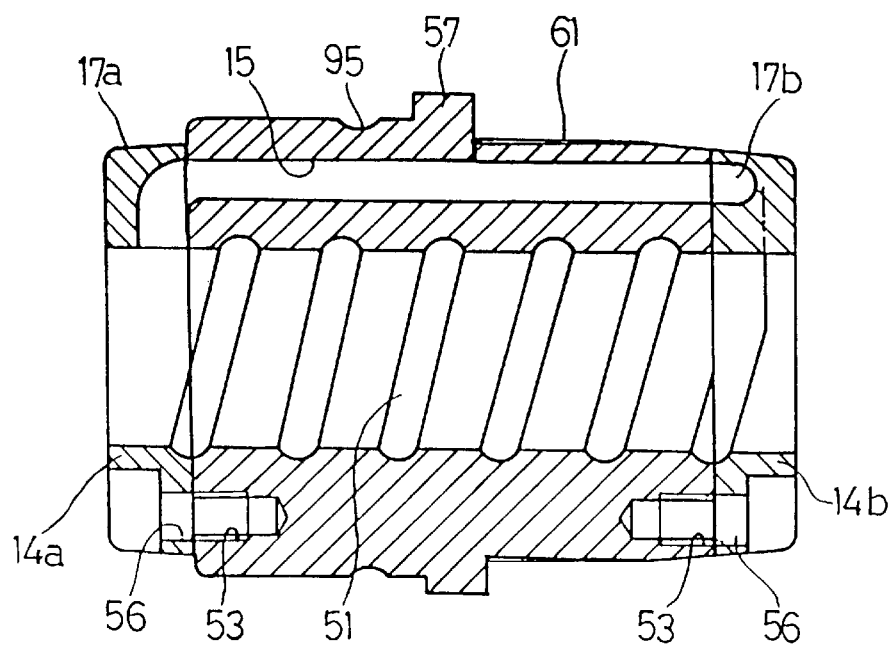
FIG. 10 is a longitudinal sectional view of a rotary nut employed in the bearing-mounted ball screw mechanism shown in FIG. 8.
Figure 11:
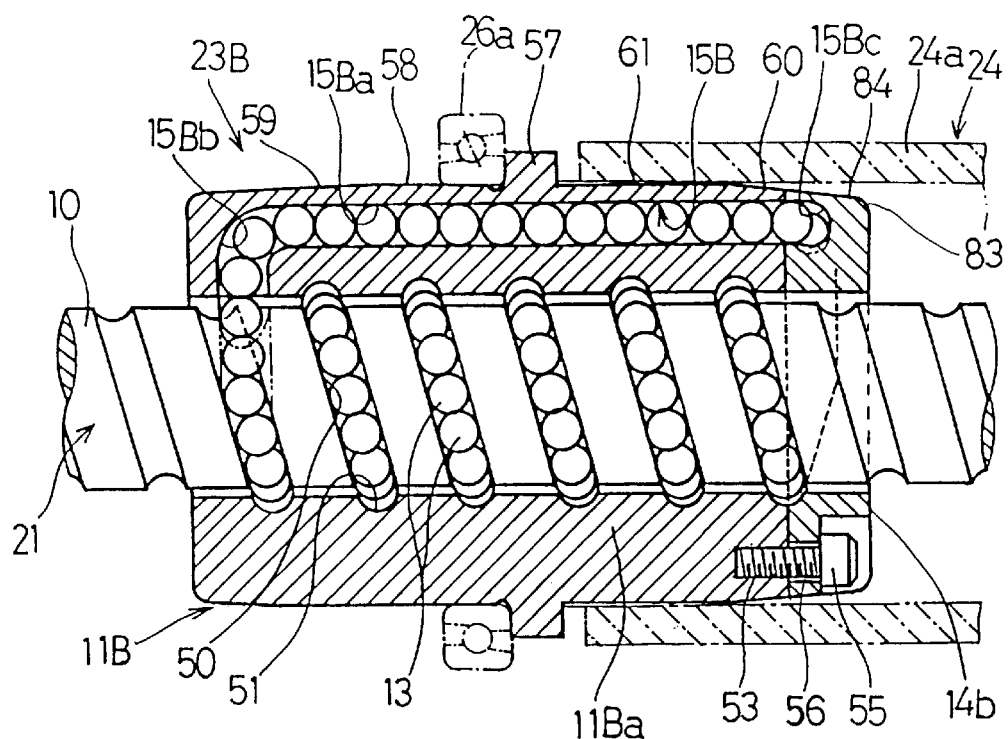
FIG. 11 is a longitudinal side view of the ball screw mechanism, with a portion broken away, for use in association with an electrically powered steering device according to a third preferred embodiment of the present invention.
Figure 12:
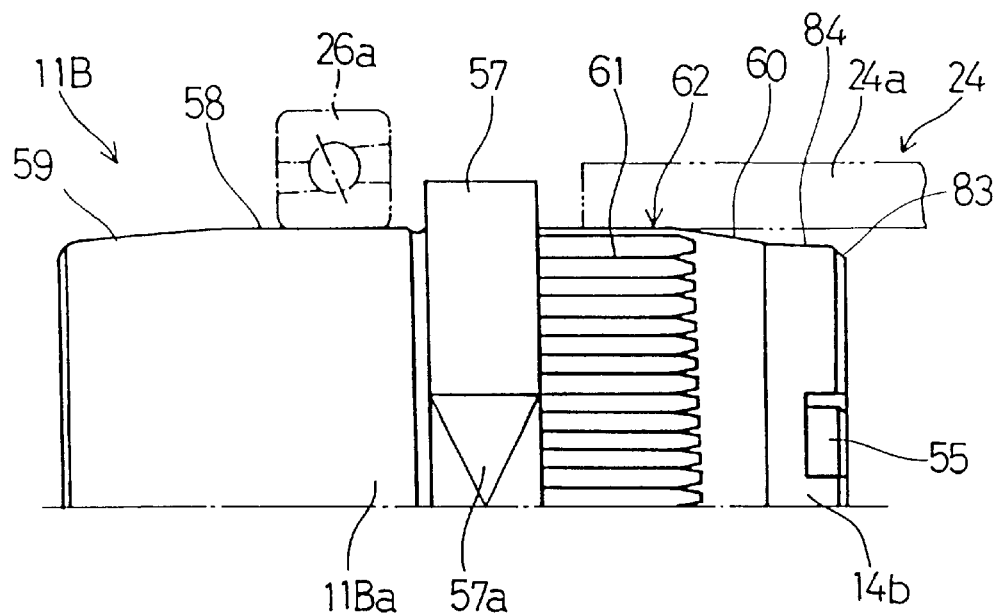
FIG. 12 is a fragmentary longitudinal side view of the ball screw mechanism showing the rotary nut mounted thereon.
Figure 13:
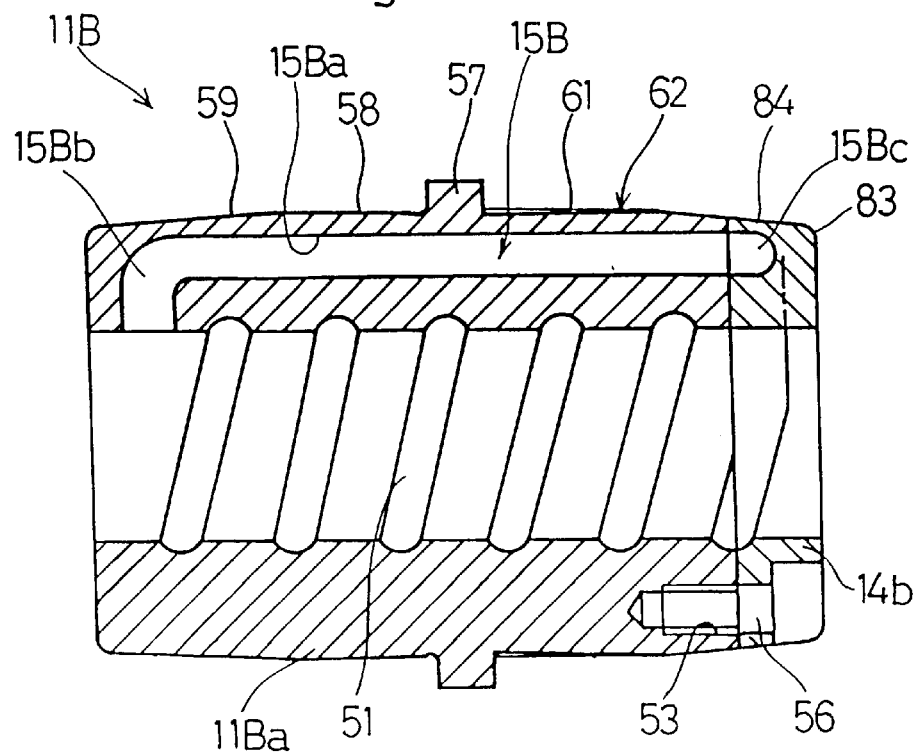
FIG. 13 is a longitudinal sectional view of the rotary nut employed in the ball screw mechanism according to the third preferred embodiment of the present invention.

As shown in FIGS. 9 and 10, the ball screw mechanism 23a is substantially similar to that employed in the first preferred embodiment except that the outer peripheral surface of the rotary nut 11A is formed with the inner race raceway 95 for the rolling bearing 26a. Therefore, the details of the ball screw mechanism 23A will not be reiterated for the sake of brevity.

In this electrically powered steering device, since the bearing-mounted ball screw mechanism 90 is of the structure in which the inner race raceway 95 for the rolling bearing 26a is formed directly on the outer peripheral surface of the rotary nut 11 A of the ball screw mechanism 23A, the bearing outer diameter D can be smaller by a quantity corresponding to the wall thickness of the inner race employed in the prior art bearing as shown in FIG. 8. Assuming that the bearing outer diameter D is equal to that in the prior art bearing, the outer diameter d of the rotary nut 11A can be increased by a quantity corresponding to the wall thickness of the inner race of the prior art bearing and, therefore, the durability of the ball screw mechanism 23A can advantageously be increased. Also, since the raceway 95 for the rolling bearing 26a are formed on the outer peripheral surface of the rotary nut 11A, the number of component parts required can be reduced, resulting in an increase of the assemblability.

The electrically powered steering device according to a third preferred embodiment of the present invention will be described hereinafter.

This electrically powered steering device according to the third preferred embodiment is substantially similar to that according to the first preferred embodiment except that the ball screw mechanism 23B different from the ball screw mechanism 23 is employed. Specifically, in the ball screw mechanism 23B employed in the third embodiment of the present invention, the end cap 14a is dispensed with.

The ball screw mechanism 23B will now be described with particular reference to FIGS. 11 to 14. The illustrated ball screw mechanism 23B includes the ball screw shaft 10, the rotary nut 10B and the group of the balls 13 interposed between the ball screw shaft 10 and the rotary nut 11B.

The ball screw mechanism 23B is of a type wherein one of the end caps is formed integrally with the nut body and is hence an integral part of the rotary nut. Specifically, the rotary nut 11B includes the nut body 11Ba and the end cap 14b firmly connected to one end of the nut body 11Ba. The end cap 14b is in the form of a ring having an inner diameter equal to that of the nut body 11Ba.

The rotary nut 11Ba has defined therein the spiral inner groove 51 facing towards and aligned with the spiral outer groove 50 on the ball screw shaft 10 and the ball circulating passage 15B continued to the opposite ends of the spiral inner groove 51. The ball circulating passage 15B is made up of the circulating tunnel 15Ba extending axially of the nut body 11Ba, and grooved end guideways 15Bb and 15Bc continued from opposite ends of the circulating tunnel 15Ba to the respective opposite ends of the spiral inner groove 51.

The nut body 11Ba has the spiral inner groove 51, the circulating tunnel 15Ba of the ball circulating passage 15B and one of the grooved end guideways 15Bb whereas the other of the grooved end guideway 15Bc is defined in the end cap 14b.

Figure 14A:
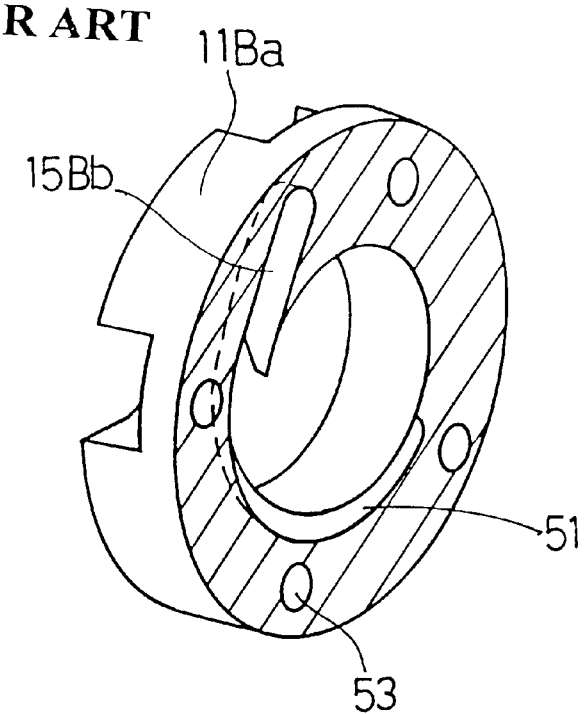
FIGS. 14A and 14B are perspective views of the rotary nut shown in FIG. 13 as viewed from different directions, respectively.
Figure 14B:
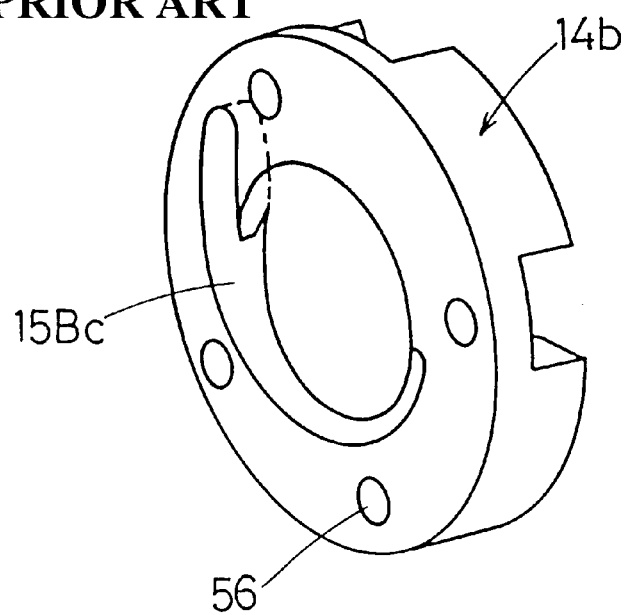

The grooved end guideway 15Bb in the nut body 11Ba is, as shown in FIG. 14A, formed as a bore extending from the adjacent end of the spiral inner groove 51 radially outwardly towards the outer periphery of the nut body 11Ba. The grooved end guideway 15Bc defined in the end cap 14b is, as shown in FIG. 14B, made up of a helical groove segment defined in an inner peripheral surface of the end cap 14b in communication with the inner spiral groove 51 and extending an angle not greater than 180 degrees with respect to the longitudinal axis of the nut body 11Ba, and a slant groove segment continued to and extending radially outwardly and slantwise from the helical groove segment.

The nut body 11Ba and the end caps 14b are formed with the bolt insertion holes 56 and the bolt holes 53 formed therein at respective locations alignable with each other and spaced circumferentially thereof. The end cap 14b has an outer surface formed with a counterbore defined therein in alignment with the respective bolt insertion hole 53. The end cap 14b is secured to the adjacent end of the nut body 11Ba by means of the bolts 55 (FIG. 11) passing through the bolt insertion holes 56 and firmly threaded into the corresponding bolt holes 53. The end cap 14b has an outer peripheral surface gradually tapered in a direction away from the nut body 11Ba to define the tapered surface 84 and a corner region 83 of the end cap 14b delimited between the outer peripheral surface and the outer surface thereof is chamfered to render it to represent an arcuately curved sectional shape.

Each of the nut body 11Ba and the end cap 14b forming respective parts of the rotary nut 11B is preferably made of a sintered alloy. As is the case with the first preferred embodiment of the present invention, formation of those component parts of the rotary nut 11B may be carried out by the use of the injection molding machine shown in FIG. 6 and using a metallic powder adjusted to represent a plastizeable form.

In the electrically powered steering device according to the third embodiment of the present invention, since the rotary nut 11B of the ball screw mechanism 23B has only one joint between the nut body 11Ba and the end cap 14b, the possibility in which rolling motion of the balls 13 in the spiral inner groove 51 and circulation of the balls 13 in the ball circulating passage 15B may be hampered in the presence of the joint can be advantageously reduced about 50% of that which would be brought about by the presence of the two joints. For this reason, rolling motion and lubrication of the balls 13 can be performed smoothly with a reduced possibility of the lubricant film on the surfaces of the balls 13 being removed. Accordingly, the ball screw mechanism 23B can have an increased lifetime. Also, since the rotary nut 11B is made up of the nut body 11Ba and the only end cap 14b, the number of the component parts is reduced, resulting in an excellent assemblility so that automation of the manufacture of the ball screw mechanism 23B can be facilitated.

In general, when the separate end cap is to be bolted to the nut body, it is a general practice that in anticipation of any possible misalignment between the end cap and the nut body during the fastening them together the end cap has an outer diameter chosen to be greater (by, for example, Φ0.2) than that of the nut body and, on the other hand, the rolling bearing is press-fitted under interference, so that the outer periphery of the end cap may not protrude radially outwardly from the outer periphery of the nut body. Accordingly, where as is the case with this embodiment of the present invention one of the end caps that is positioned adjacent the rolling bearing is formed integrally with the nut body 11Ba, not only can a job of fastening the end cap 14B to the nut body 11Ba reduced half, but also no joint is formed on the outer peripheral surface and, therefore, the rolling bearing 26a can be easily press-fitted onto the nut body 11Ba.

While only one of the end caps, that is, the end cap 14b cannot be formed integrally with and must be separate from the nut body 11Ba because of a problem associated with loading of the balls 13, the fact that the outer periphery of the end cap 14b is designed to have a composite shape including the tapered surface 84 progressively tapering away from the adjacent end of the nut body 11Ba and the arcuately chamfered corner region 83, they serves as a guide face along which the rotor 24a of the electric drive motor 24 can be guided during mounting thereof onto the rotary nut, accompanied by a further increase of the workability.

It is to be noted that as is the case with the second embodiment of the present invention, the inner race raceway for the rolling bearing 26a can be formed integrally on the outer peripheral surface of the rotary nut 11B of the ball screw mechanism 23B.

The electrically powered steering device according to a fourth preferred embodiment of the present invention employs the ball screw mechanism that is substantially similar to that according to any one of the first to third embodiment of the present invention, except that the ball screw mechanism employed in the practice of the fourth embodiment of the present invention includes a plurality of ball circulating passages and the tapered surface on the outer peripheral surface of the end of the rotary nut is dispensed with.

Figure 15:
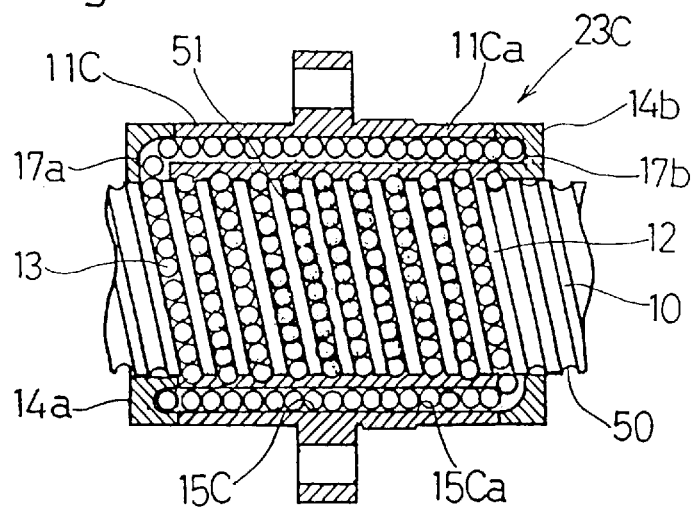
FIG. 15 is a longitudinal sectional view of the ball screw mechanism for use in association with an electrically powered steering device according to a fourth preferred embodiment of the present invention.

Referring to FIG. 15, there is shown a schematic sectional view of the ball screw mechanism employed in the practice of the fourth preferred embodiment of the present invention. As shown therein, the ball screw mechanism 23C includes the ball screw shaft 10 having the spiral outer groove 50 formed on the outer peripheral surface thereof in the form of a multi-threaded groove (for example, double-threaded groove as shown in FIG. 15), the rotary nut 11C having the spiral inner groove 51 formed on the inner peripheral surface thereof in the form of a correspondingly multi-threaded groove, and the group of the torque transmitting balls 13 disposed in series with each other in the ball rolling guideway 12 defined between the spiral outer and inner grooves 50 and 51. As shown in FIG. 15, the balls 13 are turned in a grooved reversing guideway 17a, defined in the end cap 14a at, for example, a left end of the nut body 11Ca as viewed in FIG. 15, so as to travel into a circulating tunnel 15Ca, defined in the nut body 11Ca so as to extend axially thereof, and then to move rightwards within the circulating tunnel 15Ca towards the right-hand end cap 14b as viewed in FIG. 15. The balls 13 moving towards the right-hand end cap 14b subsequently travel into the ball rolling passage 12, defined between the ball screw shaft 10 and the nut body 11Ca, through a grooved reversing guideway 17b defined in the end cap 14b. In this way, the balls 13 circulate within the ball screw mechanism 23C. The nut body 11Ca has a substantial wall thickness so that the circulating tunnel 15Ca can be formed in a number corresponding to the number of the multi-threads within the wall of the nut body 11Ca in a fashion spaced circumferentially thereof. Thus, in the practice of the fourth embodiment of the present invention, the grooved reversing guideways 17a and 17b which serve as upper and lower ball circulating passages 15C each communicating the opposite ends of the ball rolling passage 12, and the circulating tunnel 15Ca are defined in the nut body 11Ca and the end caps 14a and 14b firmly fastened to the respective ends of the nut body 11Ca.

Figure 16A:
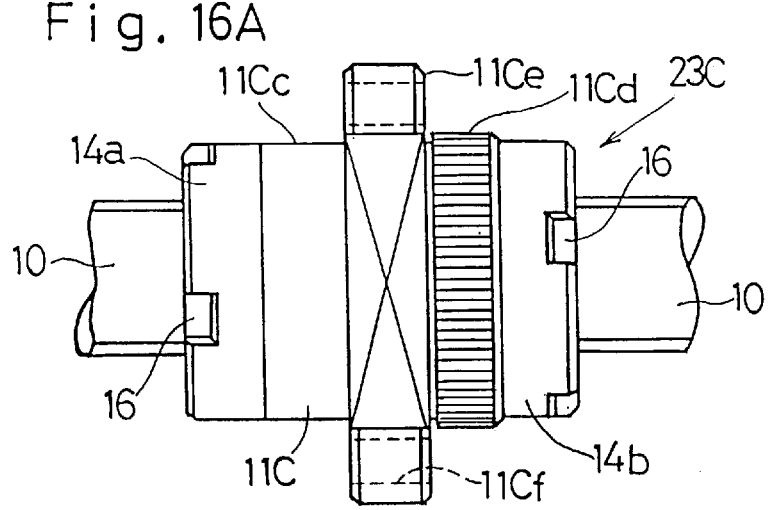
FIG. 16A is a longitudinal side view of the ball screw mechanism of FIG. 15 showing the rotary nut employed therein.

The end caps 14a and 14b are firmly secured to the respective ends of the nut body 11Ca as shown in FIG. 16A by means of fixing bolts 16 such as those having a hexagonal counterbore in their head. As shown in FIGS. 17A and 17B, a mounting hole defined in each of the end caps 14a and 14b for receiving the respective fixing bolt 16 has a counterbore 19 defined therein, in which the head of the respective fixing bolt 16 can be completely seated within the counterbore 19 without protruding outwardly from an outer end face of the associated end cap 14a or 14b. In addition, each of the counterbores 19 has a suitable number, for example, two as shown in FIG. 17A, of projections 19a defined therearound so that, after the respective fixing bolt 16 has been fastened, the projections 19a can be plastically deformed by staking with the use of a suitable staking tool (not shown) to thereby form respective lock pieces 19a as shown in FIG. 17C which serve to avoid any possible loosening of the fastened fixing bolt 16.

The grooved reversing guideways 17a and 17b defined in the respective end caps 14a and 14b are so formed as to open at corresponding end faces as shown in FIGS. 18A and 18B, respectively. These grooved reversing passages 17a and 17b correspond in position and also in number to the position and the number of the circulating tunnels 15Ca defined in the nut body 11Ca and are formed generally spirally to follow the spiral direction of the ball rolling passage 12 so as to extend arcuately or tangentially around the ball screw shaft 10, so that the opposite ends of the circulating tunnels 15Ca can be smoothly communicated with the ball rolling passage 12.

In addition, the grooved reversing passages 17a and 17b defined in the respective end caps 14a and 14b are, as shown in FIGS. 18A and 18B, shaped to represent a groove of a generally semi-circular cross section having an inner diameter slightly greater than the outer diameter of each ball 13, whose depth is maximum at a location where they communicate with the circulating tunnel 15Ca and minimum at a location where they communicate with the ball rolling passage 12. Thus, each grooved reversing passage 17a and 17b has a groove depth varying continuously to represent a generally inclined groove.

The grooved reversing passages 17a and 17b may be formed in respective opposite end faces of the nut body 11Ca in communication with the circulating tunnel 15Ca as shown in FIGS. 18C and 18D. It is to be noted that in FIGS. 18A to 18D the grooved reversing passages 17a and 17b are so formed as to straddle between the end faces of the nut body 11Ca and the end caps 14a and 14b, but they may not be always limited thereto and they may be formed only one of them.

For positioning the grooved reversing passages 17a and 17b, formed in the respective end caps 14a and 14b, relative to the circulating tunnel 15Ca, annular positioning projections 18a and annular positioning recesses 18b adapted to receive therein the annular positioning projections 18a are preferably formed at respective locations adjacent to the circulating tunnel 15Ca so that, when the annular positioning projections 18a are engaged in the associated annular positioning recesses 18b, the grooved reversing passages 17a and 17b can be accurately positioned in alignment with the circulating tunnel 15Ca.

Figure 16B:
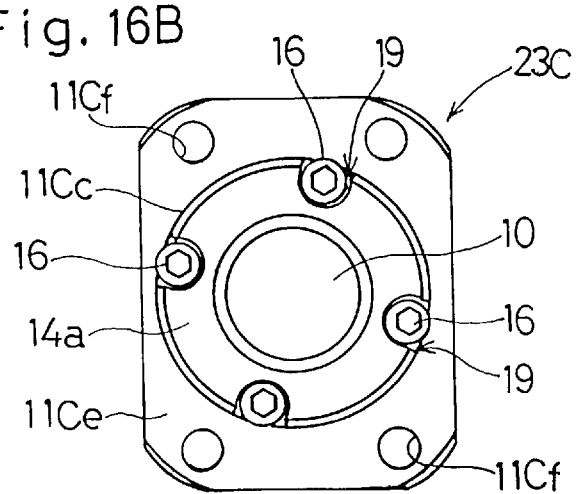
FIG. 16B is an end view of the ball screw mechanism shown in FIG. 16A.
Figure 19A:
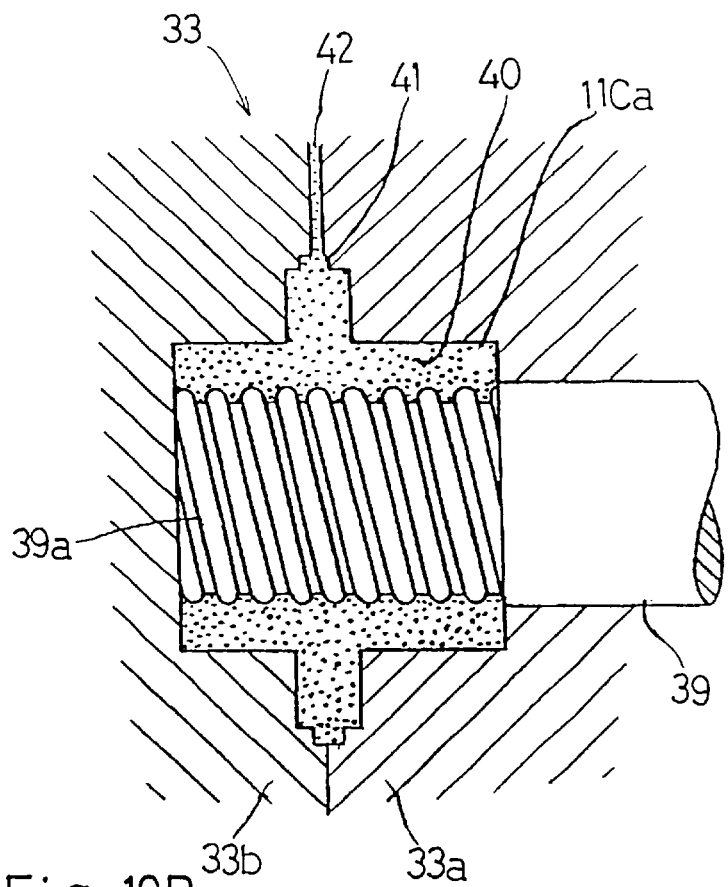
FIG. 19A is a schematic sectional view showing a mold used in an injection molding process to form the rotary nut.

The outer peripheral surface of the rotary nut 11C has defined therein a bearing mounting surface area 11Cc (See FIG. 16) on which the rolling bearing 16a for rotatably supporting the rotary nut 11C relative to the housing 25 shown in FIG. 19A is mounted and a motor mounting surface area 11Cd (See FIG. 16) onto which the cylindrical rotor 24a of the electric drive motor 24 is mounted. The bearing mounting surface area 11Cc is, as shown in FIG. 16A, formed with a radially outwardly protruding flange 11Ce which forms a positioning shoulder for the rolling bearing 26a whereas the motor mounting surface area 11Cd is formed with a parallel knurled surface region for avoiding any possible rotational creep of the rotor 24a. The annular flange 11Ce is formed with a plurality of mounting holes 11Cf (See FIGS. 16A and 16B) for mounting of the rotor 24a of the electric drive motor 24. The above described flange 11Be may be in the form of a ring, but it is preferred in terms of the lightweight and compact feature that as shown in FIG. 16B left and right portion of the flange is cut out to provide left and right flat side faces that are spaced therebetween a distance generally equal to the outer diameter of the rotary nut 11C and top and bottom portions of the flange are also cut out without affecting the respective positions of the mounting holes 11Cf to provide flat top and bottom faces. It is to be noted that as is the case with the second preferred embodiment of the present invention, the outer peripheral surface of the rotary nut 11C of the ball screw mechanism 23C may be formed integrally with the inner race raceway for the rolling bearing 26a.

The spiral outer groove 50 formed in the ball screw shaft 10 is formed by the use of the rolling process and the end caps 14a and 14b and the nut body 11Ca are formed by the use of the MIM (metal injection molding) process. The MIM process is such that as is the case hereinbefore described, the product can be manufactured by adjusting the metallic powder in the form of a plastizeable form and with the use of the injection molding machine shown in FIG. 6.

A mold assembly 33 into which a material for the nut body 11Ca is injected to form the nut body 11Ca is, as shown in FIG. 19A, comprised of a stationary mold 33a and a movable mold 33b and a cylindrical core 39 with a molding cavity 40 for the formation of the nut body 11Ca defined between the stationary and movable molds 33a and 33b. An operative end of the cylindrical core 39 is formed with a spiral projection 39a complemental in shape to and for forming the spiral outer groove 50 of a multi-thread shape. After the injection molding of the nut body 11Ca, the cylindrical core 39 is rotated about its own longitudinal axis to allow it to be removed out of the mold assembly 33. In FIG. 19A, reference numeral 41 represents a gate and reference numeral 42 represents a runner.

Figure 19B:
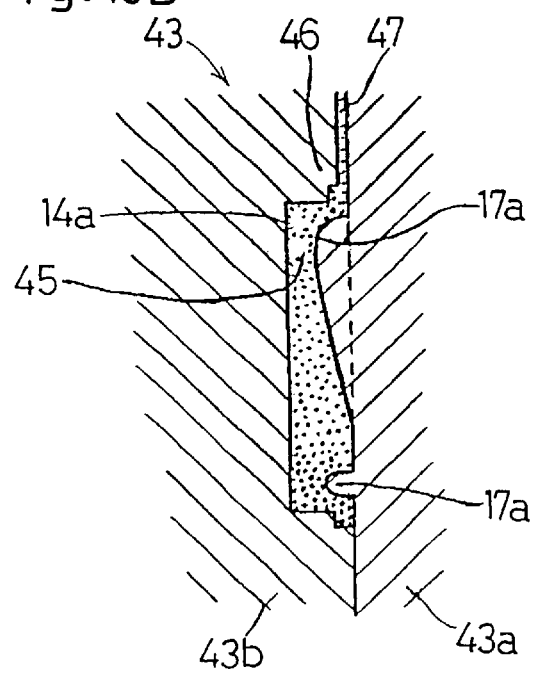
FIG. 19B is a schematic sectional view showing a mold used in an injection molding process to form the end cap.

FIG. 19B schematically illustrates a mold assembly 43 used for injection molding of the end cap 14a, which is made up of a stationary mold 43a and a movable mold 43b with a cavity for forming the end cap 14a defined therebetween. This mold assembly 43 has an interior surface facing the molding cavity 45, which surface is formed with projections and recesses complemental in shape to and for forming the grooved reversing passage 17a in the end cap 14a, the counterbores 19 (not shown) and the staking projections 19a (not shown), respectively, at corresponding predetermined locations. In FIG. 19B, reference numeral 46 represents a gate and reference numeral 47 represents a runner. Although the end cap 14b can be injection molded by the use of a similar mold assembly, but the identical mold assembly may be used to form the end caps 14a and 14b if the end caps 14a and 14a are identical in structure to each other and of a symmetrical structure.

The nut body 11Ca formed by the injection molding process using the above described mold assembly 33 and the end cap 14a formed by the injection molding process using the above described mold assembly 43 are, after having been removed from the respective mold assemblies 33 and 43, loaded into a sintering furnace (not shown) where they are sintered. After the sintering, the nut body 11Ca is bored to provide the circulating tunnel 15Ca and the bold holes 16A (See FIG. 18C) and, on the other hand, the counterbores 19 in the end cap 14a are bored to provide the corresponding bolt holes 16b (See FIG. 18A). Thereafter, they are optionally carburized and hardened as desired. It is to be noted that the annular positioning projections 18a and the associated positioning recesses 18b for receiving the corresponding positioning projections 18a as shown in FIGS. 18A to 18D are preferably formed by the use of the injection molding process. It is also to be noted that the bolt holes 16a in the nut body 11Ca are preferably in the form of a blind hole rather than being bored completely across the length of the nut body 11Ca.

In the electrically powered steering device according to the fourth preferred embodiment of the present invention, for the reason which will be subsequently described, it is suggested to form at least the end caps 14a and 14b out from the group of the end caps 14a and 14b and the nut body 11Ca are manufactured by the MIM process. Specifically, since the end cap type is advantageous in that the structure of the rotary nut 11C can be simplified with no projection formed on the outer periphery of the rotary nut 11C with the radial size thereof reduced substantially, the electrically powered steering device as a whole can be assembled in a compact size. On the other hand, since the above described end cap type although simple in structure is such that the direction of turn of the group of the balls 13 lies generally at right angles, it is necessary the shape and the dimension of the grooved reversing passages 17a and 17b formed respectively in the end caps 14a and 14b must be accurately tailored in order to secure a smooth circulating motion of the balls 13. Also, where the ball rolling passage 12 is formed of the multi-thread design, the grooved reversing passages 17a and 17b in the respective end caps 14a and 14b tend to become complicated in shape, requiring an increased number of machining steps wherefore they are not suited for ass-production. With respect to the spiral inner groove 51 in the nut body 11Ca, here it is in the form of the multi-thread design, similar problems will arise.

Although the use of a synthetic resin as a material for the end caps 14a and 14b can be contemplated, there is a possibility that the durability will be reduced as a result of frictional wear and no smooth circulating motion of the balls will be ensured because of change in dimension as a result of thermal shrinkage and, in addition, the fixing bolts can be firmly fastened with a proper torque. The present invention makes use of the MIM process capable of utilizing advantages of the both so that the end caps 14a and 14b and the nut body 11Ca of the ball screw mechanism that is used in the electrically powered steering device for use in the automotive vehicle can be accurately and inexpensively manufactured. In addition, the outer periphery of the rotary nut 11C can be simplified to allow the rotor 24a of the electric drive motor 24 and the rolling bearing 26a to be mounted one over the other, resulting in reduction in radial size and increase of the load bearing capacity.

Also, if the end caps 14a and 14b are connected to the opposite ends of the nut body 11Ca merely by theadingly fastening the fixing bolts 16, the use thereof in the electrically powered steering device for the automotive vehicle would result in undesirable loosening of some or all of the fixing bolts 16 under influence of vibrations and the end caps 14a and 14b would eventually separate from the nut body 11Ca. However, according to the present invention, since the end caps 14a and 14b are formed with the projections 19a around the corresponding counterbores 19 so that, after the fixing bolts 16 have been fastened, those projections 19a can be staked by the use of any suitable staking tool to form the lock pieces 19a' to avoid any possible undoing of the fixing bolts 16 with a simplified structure. Therefore, a smooth circulation of the balls 13 can be ensured with the functionality and the reliability of the ball screw mechanism 23C increased substantially.

A fifth preferred embodiment of the present invention will now be described.

The electrically powered steering device according to the fifth preferred embodiment of the present invention differs from that according to any one of the first to fourth embodiments of the present invention in that the electrically powered steering device according to the fifth embodiment employs the ball screw mechanism of a bridge type, but is substantially similar to that according to any one of the first to fourth embodiment so far as the other component parts are concerned.

Figure 20:
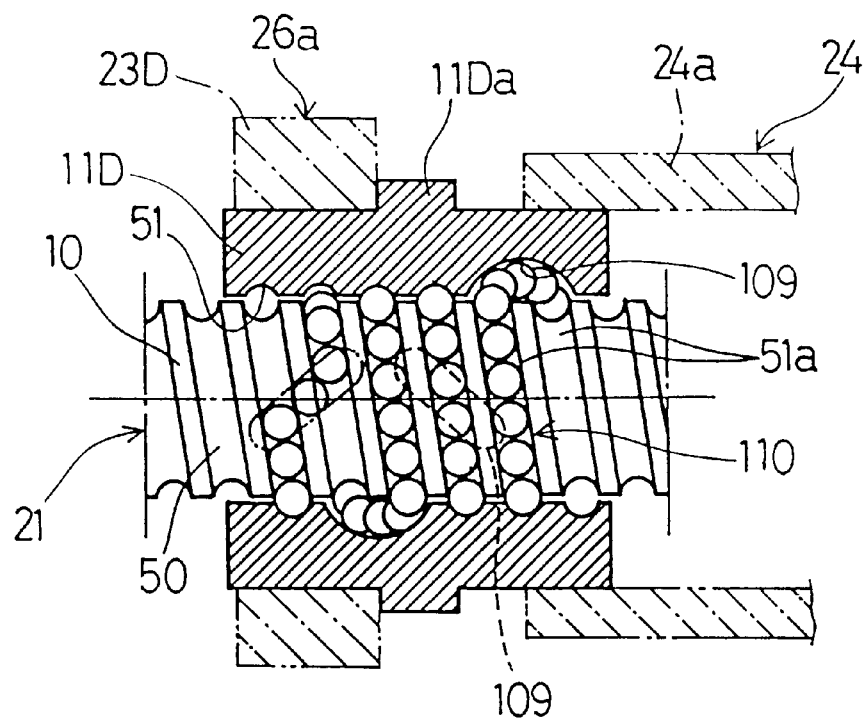
FIG. 20 is a longitudinal side view of the ball screw mechanism, with a portion broken away, for use in association with an electrically powered steering device according to a fifth preferred embodiment of the present invention.
Figure 21:
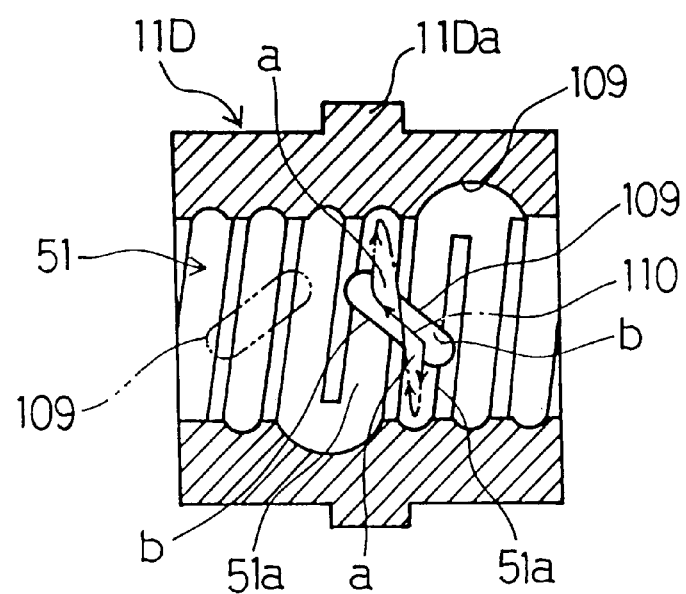
FIG. 21 is a sectional view of the rotary nut used in the ball screw mechanism shown in FIG. 20.
Figure 22:
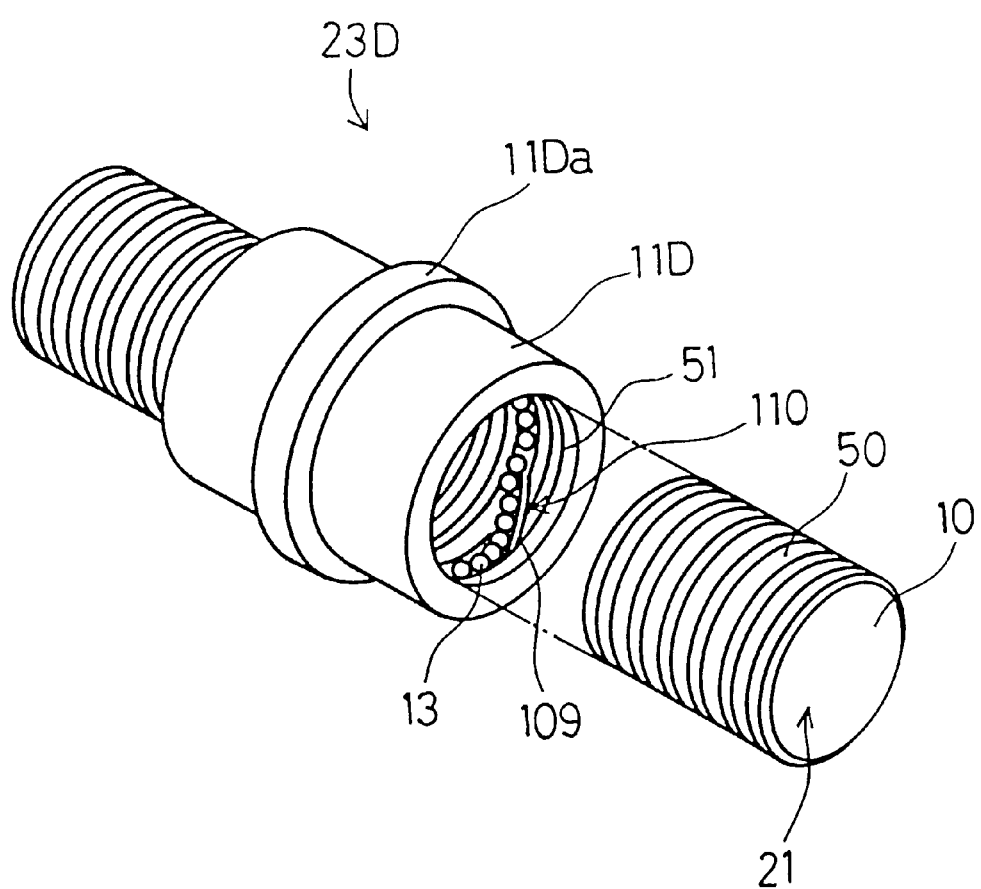
FIG. 22 is an exploded perspective view of the ball screw mechanism shown in FIG. 20.
Figure 23A:
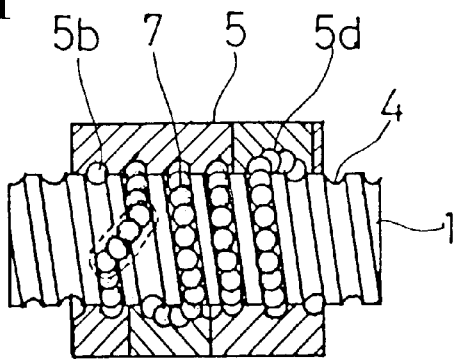
FIGS. 23A to 23C are schematic longitudinal sectional views showing different prior art ball screw mechanisms.
Figure 23B:
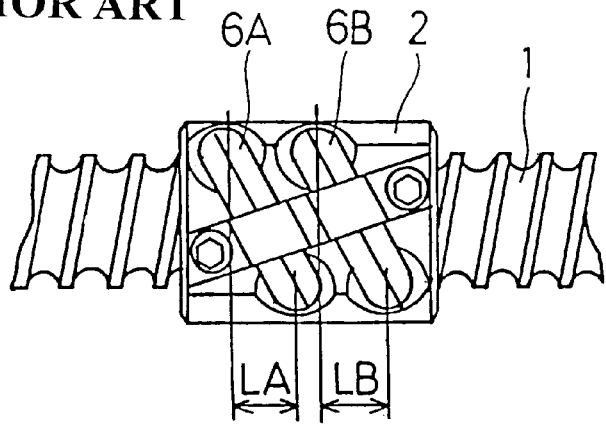
Figure 23C:
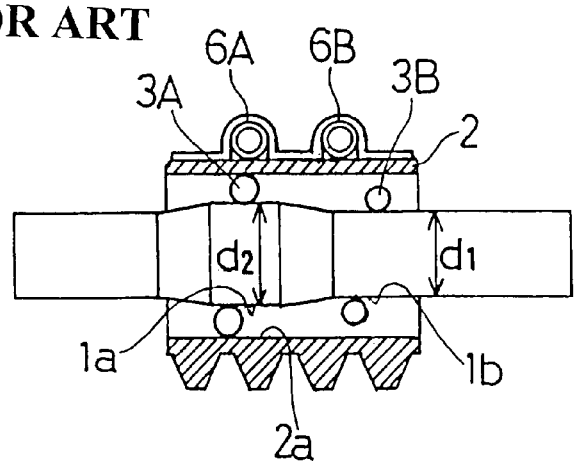
Figure 24:
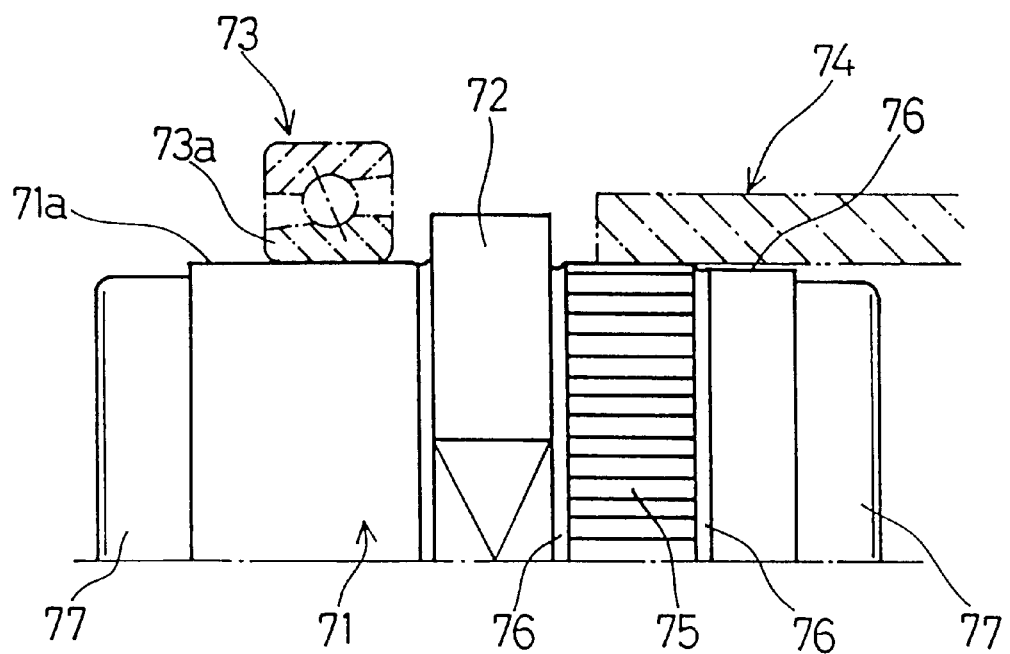
FIG. 24 is a fragmentary longitudinal side view of the prior art ball screw mechanism.

With particular reference to FIGS. 20 to 22, the ball screw mechanism 23D will be described in detail. This ball screw mechanism 23D is a bridge type ball screw mechanism in which a bridge member is formed integrally with the rotary nut as will now be described. The ball screw shaft 10 has the spiral outer groove 50 whereas the rotary nut 11D has the spiral inner groove 51 confronting and aligned with the spiral outer groove 50. The spiral outer and inner grooves 50 and 51 define a raceway along which the balls 13 positioned between the spiral outer and inner grooves 50 and 51 move rollingly, which raceway has a generally accurate sectional shape or a sectional shape similar to the shape of a Gothic arch.

The rotary nut 11d has its inner peripheral surface formed with the spiral inner groove 51 and a return groove 109 communicating the neighboring convolutions 51a and 51a of the spiral inner groove 51, and the single convolution 51a of the spiral inner groove 51 and the return groove 109 altogether form a circumferential circuit 110 for the balls. In other words, opposite ends of the single convolution 51a of the spiral inner groove 51 are communicated with the single return groove 109 to define the circumferential circuit 110 of a length corresponding to the circumference of the single convolution as shown by the single-dotted line in FIG. 21. The return groove 109 has a depth sufficient to allow each of the balls 13, movably seated in the spiral outer groove 50 on the ball screw shaft 10, to ride over a crest of the spiral outer groove 50. Also, this return groove 109 has one side portion a communicated with the adjacent convolution 51a of the spiral inner groove 51 and having a size sufficient to allow each ball 13 to enter the adjacent convolution 51a of the spiral inner groove 51, but the opposite side portion b being of a size incapable of allowing the respective ball 13 to enter the adjacent convolution 51a of the spiral inner groove 51. Means for establishing this incapability of allowing the balls 13 to enter the adjacent convolution 51a may be constituted by a member that is formed integrally with, or separately affixed to, a side edge of the return groove 109 and is effective to close the entity or a portion of a cross-section of the spiral inner groove 51.

The number of the convolutions 51a of the spiral inner groove 51 in the rotary nut 11D may be any suitable, arbitrarily chosen value and the number of the circumferential circuit 110 can be suitably chosen to correspond to the number of the convolutions 51a of the spiral inner groove 51. The circumferential position of the return groove 109 of each circumferential circuit 110 may be suitably chosen as desired and, in the illustrated embodiment, they are positioned an angle of 90 degree in a direction circumferentially of the rotary nut 11D around the ball screw shaft 10.

It is to be noted that even in the fifth embodiment of the present invention, the outer peripheral surface of the rotary nut 11D of the ball screw mechanism 23D may be formed integrally with the inner race raceway for the rolling bearing 26a as is the case with the second embodiment of the present invention.

The rotary nut 11D is integrally formed in its entirety with the use of a sintered alloy and, accordingly, respective portions of the rotary nut 11D where the return groove 109, the spiral inner groove 51 and the outer peripheral surface are formed are integrally formed together. In the illustrated embodiment, the rotary nut 11D is an integrally molded part including the annular projection 11Da on the outer periphery thereof, but a portion which will be eventually formed as the annular projection 11Da may be a member separate from the rotary nut 11D and may be fixedly mounted on a member which will eventually form the body of the rotary nut 11D. Manufacture of the rotary nut 11D may be carried out in a manner similar to that described hereinbefore, i.e., by adjusting the metallic powder in a plasticizeable fashion and molding by the use of the injection molding machine shown in FIG. 6.

In the electrically powered steering device according to the fifth embodiment of the present invention, since the rotary nut 11D is of the design wherein the neighboring convolutions 51a of the spiral inner groove 51 are connected together by means of the return groove 109, no ball return passage is formed on an outer periphery of the nut as is the case with the prior art bridge type and, therefore, the rotary nut 11D can have a reduced outer diameter. Moreover, since the return groove 109 is formed integrally with the rotary nut 11D, unlike the bridge type, no step which would be formed on the outer peripheral surface of the rotary nut 11D when a separate member is mounted is formed on the outer peripheral surface of the rotary nut 11D and, therefore, not only can the inner race of the rolling bearing 26a for supporting the rotary nut 11D be positioned and fixed on the outer peripheral surface of the rotary nut 11D, but also the rotor 24a of the electric drive motor 24 can also be mounted on the outer periphery of the rotary nut 11D. In view of these features, the electrically powered steering device as a whole can be assembled in a compact size. Also, since the return groove 109 is formed integrally in the rotary nut 11D, no joint is formed on the inner peripheral surface of the rotary nut 11D and, therefore, not only can the balls circulate smoothly, but also the ball screw mechanism 23D can have an increased lifetime with no possibility of the lubricant film on the surface of each ball 13 being removed. In addition, there is no need to fix the bridge member within the engagement hole in the rotary nut by the use of the bonding material such as required in the prior art bridge type ball screw mechanism and, therefore, not only can the workability be increased, but the problem associated with oozing of the bonding material can be advantageously eliminated and no job of removing the deposit of the bonding material is necessary, permitting an increased productivity.

Since the rotary nut 11D is made of the sintered alloy, it can be manufactured by the use of the injection molding process and the sintering technique, thereby eliminating the need to perform any machining process such as turning and grinding while allowing an excellent mass productivity. The technique in which the injection molding technique and the sintering technique are utilized in combination, which is highly precise, has been developed and, therefore, it can be utilized to manufacture the rotary nut 11D with high precision.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An electrically powered steering device which comprises:
    a housing;
    a steering shaft drivingly connected with a steering mechanism for steering wheels and extending completely through the housing;
    a motion translating mechanism for translating a rotary force exerted by a steering wheel into a force required to move the steering shaft in a direction axially of the steering shaft;
    a ball screw mechanism including a ball screw shaft constituting a portion of the steering shaft, and a rotary nut; and
    an electric drive motor mounted at one end on an outer periphery of the rotary nut of the ball screw mechanism:
        wherein said ball screw mechanism comprises the ball screw shaft having a spiral outer groove formed there around;
        the rotary nut formed with a spiral inner groove confronting to and aligned with the spiral outer groove on the ball screw shaft;
        a plurality of torque transmitting balls disposed in a series within a ball rolling guideway defined between the spiral outer groove on the ball screw shaft and the spiral inner groove in the rotary nut and for transmitting a force between the rotary nut and the steering shaft; and
        a rolling bearing mounted on an outer periphery of the rotary nut for rotatably supporting the rotary nut relative to the housing, and wherein the outer periphery of the rotary nut is formed integrally with a radially outwardly protruding positioning flange for positioning the rolling bearing mounted thereon; and
        wherein a ball circulating passage communicating with the ball rolling guideway at its respective opposite ends is formed in part in a nut body of the rotary nut and in part in at least one end cap secured to respective opposite ends of the nut body.

2. The electrically powered steering device as claimed in claim 1, wherein the ball circulating passage includes a circulating tunnel defined in the nut body so as to extend axially thereof, and a passage defined in one or both of an end face of the nut body and an inner end face of the end cap held in contact with such end face of the nut body so as to straddle therebetween for communicating a corresponding end of the circulating tunnel with the ball rolling guideway.

3. The electrically powered steering device as claimed in claim 1, wherein each of the end caps has a counterbore that is staked to prevent a fixing bolt, used to secure the respective end cap fixedly to the nut body, from being rotated arbitrarily.

4. The electrically powered steering device as claimed in claim 1, wherein the ball rolling guideway of the ball screw mechanism is of a multi-thread design.

5. The electrically powered steering device as claimed in claim 1, wherein an outer periphery of one of opposite ends of the nut body forming a part of the rotary nut and having the spiral inner groove confronting to and aligned with the spiral outer groove around the ball screw shaft, and a circulating tunnel for the balls is formed as a tapered surface tapering axially inwardly.

6. The electrically powered steering device as claimed in claim 5, wherein a portion of an outer peripheral surface of the nut body that is continued from the tapered surface is formed into a cylindrical surface and wherein a knurled surface region for avoiding an arbitrary rotation is formed on the cylindrical surface and a portion of the tapered surface adjacent the cylindrical surface.

7. The electrically powered steering device as claimed in claim 5, wherein each of the end caps has an outer peripheral surface that is tapered in a direction away from the nut body.

8. The electrically powered steering device as claimed in claim 1, wherein an inner race raceway for the rolling bearing of the ball screw mechanism is formed integrally on an outer peripheral surface of the rotary nut.

9. The electrically powered steering device as claimed in claim 1, wherein each of the end caps is made of a sintered alloy.

10. The electrically powered steering device as claimed in claim 1, wherein a nut body of the rotary nut is made of a sintered alloy.

11. The electrically powered steering device as claimed in claim 1, wherein the spiral outer groove of the ball screw mechanism has a groove face formed with a hardened layer of a generally uniform depth that is formed by means of a high frequency hardening process.

12. The electrically powered steering device as claimed in claim 11, wherein the hardened layer has a Rockwell hardness HRC within the range of 55 to 62.

13. The electrically powered steering device as claimed in claim 11, wherein the hardened layer has an effective hardened layer depth within the range of 0.02 to 1.10 mm.

14. An electrically powered steering device which comprises:
- a housing;
- a steering shaft drivingly connected with a steering mechanism for steering wheels and extending completely through the housing;
- a motion translating mechanism for translating a rotary force exerted by a steering wheel into a force required to move the steering shaft in a direction axially of the steering shaft;
- a ball screw mechanism including a ball screw shaft constituting a portion of the steering shaft, and a rotary nut; and
- an electric drive motor mounted at one end on an outer periphery of the rotary nut of the ball screw mechanism:
    - wherein said ball screw mechanism comprises the ball screw shaft having a spiral outer groove formed there around;
    - the rotary nut formed with a spiral inner groove confronting to and aligned with the spiral outer groove on the ball screw shaft; and
    - a plurality of torque transmitting balls disposed in a series within a ball rolling guideway defined between the spiral outer groove on the ball screw shaft and the spiral inner groove in the rotary nut and for transmitting a force between the rotary nut and the steering shaft;
- wherein a ball circulating passage communicating with the ball rolling guideway at its respective opposite ends is formed in part in a nut body of the rotary nut and in part in at least one end cap secured to an end of the nut body; and
- wherein an outer periphery of one of opposite ends of the nut body forming a part of the rotary nut and having the spiral inner groove confronting to and aligned with the spiral outer groove around the ball screw shaft, and a circulating tunnel for the balls is formed as a tapered surface tapering axially inwardly, and
- wherein a portion of an outer peripheral surface of the nut body that is continued from the tapered surface is formed into a cylindrical surface and wherein a knurled surface region for avoiding an arbitrary rotation is formed on the cylindrical surface and a portion of the tapered surface adjacent the cylindrical surface.

* * * * *